United States Patent
Cassell et al.

(10) Patent No.: US 9,547,144 B2
(45) Date of Patent: Jan. 17, 2017

(54) FIBER OPTIC DISTRIBUTION NETWORK FOR MULTIPLE DWELLING UNITS

(75) Inventors: Daniel Andrew Cassell, Hickory, NC (US); Mark Robert Dagley, Fort Worth, TX (US); Gerry Jay Harvey, Newton, NC (US); Diana Rodriguez, Fort Worth, TX (US); Antwan Joco'ques Works, Lewisville, TX (US)

(73) Assignee: Corning Optical Communications LLC, Hickory, NC (US)

( * ) Notice: Subject to any disclaimer, the term of this patent is extended or adjusted under 35 U.S.C. 154(b) by 597 days.

(21) Appl. No.: 13/613,759

(22) Filed: Sep. 13, 2012

(65) Prior Publication Data

US 2013/0034336 A1 Feb. 7, 2013

Related U.S. Application Data

(63) Continuation of application No. PCT/US2011/028650, filed on Mar. 16, 2011.

(60) Provisional application No. 61/314,358, filed on Mar. 16, 2010.

(51) Int. Cl.
*G02B 6/46* (2006.01)
*G02B 6/44* (2006.01)
*G02B 6/38* (2006.01)

(52) U.S. Cl.
CPC ........... *G02B 6/4447* (2013.01); *G02B 6/4466* (2013.01); *G02B 6/3897* (2013.01); *G02B 6/4455* (2013.01)

(58) Field of Classification Search
CPC ............................ G02B 6/4457; G02B 6/4466
See application file for complete search history.

(56) References Cited

U.S. PATENT DOCUMENTS

| | | | |
|---|---|---|---|
| 1,280,393 | A | 10/1918 | Cannon |
| 1,703,255 | A | 2/1929 | Wagner |
| 2,003,147 | A | 5/1935 | Holm-Hansen |
| 2,044,073 | A | 6/1936 | Hurley |
| 2,131,408 | A | 9/1938 | Murrer |

(Continued)

FOREIGN PATENT DOCUMENTS

| | | |
|---|---|---|
| DE | 4130706 A1 | 3/1993 |
| DE | 4133375 C1 | 4/1993 |

(Continued)

OTHER PUBLICATIONS

Non-final Office Action for U.S. Appl. No. 13/094,572 mailed Jan. 18, 2013, 17 pages.

(Continued)

*Primary Examiner* — Omar R Rojas

(57) ABSTRACT

A fiber optic network for a multiple dwelling unit (MDU) is disclosed. The fiber optic network comprises a riser cable preconnectorized with a first riser optical connector. The riser cable is optically connected to a feeder cable providing optical communication service to the MDU. The riser cable has one or more preset mid-span access points along the length of the riser cable. One or more optical fibers of the riser cable extend from the riser cable at the one or more preset mid-span access points and are preconnectorized with a second riser optical connector. A payout reel is adapted to pay out the riser cable such that the riser cable extends between the lower level and at least one of the one or more distribution levels. The payout reel is adapted to store a length of the riser.

14 Claims, 17 Drawing Sheets

(56) References Cited

U.S. PATENT DOCUMENTS

| | | |
|---|---|---|
| 2,428,149 A | 9/1947 | Falk |
| 2,681,201 A | 6/1954 | Grunwald |
| 2,984,488 A | 5/1961 | Kirchner |
| 3,054,994 A | 9/1962 | Haram |
| 3,204,867 A | 9/1965 | Wahlbom |
| 3,435,124 A | 3/1969 | Channell |
| 3,880,390 A | 4/1975 | Niven |
| 4,006,540 A | 2/1977 | Lemelson |
| 4,012,010 A | 3/1977 | Friedman |
| 4,073,560 A | 2/1978 | Anhalt et al. |
| 4,123,012 A | 10/1978 | Hough |
| 4,177,961 A | 12/1979 | Gruenewald |
| 4,210,380 A | 7/1980 | Brzostek |
| D257,613 S | 12/1980 | Gruenewald |
| 4,244,544 A | 1/1981 | Kornat |
| 4,261,529 A | 4/1981 | Sandberg et al. |
| 4,261,644 A | 4/1981 | Giannaris |
| 4,480,449 A | 11/1984 | Getz et al. |
| 4,497,457 A | 2/1985 | Harvey |
| 4,502,754 A | 3/1985 | Kawa |
| 4,506,698 A | 3/1985 | Garcia et al. |
| 4,524,384 A | 6/1985 | Lefkowitz et al. |
| D281,574 S | 12/1985 | O'Hara, II |
| 4,579,310 A | 4/1986 | Wells et al. |
| 4,586,675 A | 5/1986 | Brown |
| 4,595,255 A | 6/1986 | Bhatt et al. |
| 4,611,887 A | 9/1986 | Glover et al. |
| 4,697,873 A | 10/1987 | Bouvard et al. |
| 4,736,100 A | 4/1988 | Vastagh |
| 4,747,020 A | 5/1988 | Brickley et al. |
| 4,778,125 A | 10/1988 | Hu |
| 4,806,814 A | 2/1989 | Nold |
| 4,810,054 A | 3/1989 | Shinbori et al. |
| 4,824,193 A | 4/1989 | Maeda et al. |
| 4,836,479 A | 6/1989 | Adams |
| 4,844,573 A | 7/1989 | Gillham et al. |
| 4,884,863 A | 12/1989 | Throckmorton |
| 4,900,118 A | 2/1990 | Yanagawa et al. |
| 4,900,123 A | 2/1990 | Barlow et al. |
| 4,948,220 A | 8/1990 | Violo et al. |
| 4,961,623 A | 10/1990 | Midkiff et al. |
| 4,979,749 A | 12/1990 | Onanian |
| 4,995,688 A | 2/1991 | Anton et al. |
| 5,007,701 A | 4/1991 | Roberts |
| 5,023,646 A | 6/1991 | Ishida et al. |
| 5,048,916 A | 9/1991 | Caron |
| 5,048,926 A | 9/1991 | Tanimoto |
| 5,066,149 A | 11/1991 | Wheeler et al. |
| 5,071,211 A | 12/1991 | Debortoli et al. |
| 5,071,220 A | 12/1991 | Ruello et al. |
| 5,073,042 A | 12/1991 | Mulholland et al. |
| 5,074,635 A | 12/1991 | Justice et al. |
| 5,076,688 A | 12/1991 | Bowen et al. |
| 5,085,384 A | 2/1992 | Kasubke |
| 5,112,014 A | 5/1992 | Nichols |
| D327,312 S | 6/1992 | Myojo |
| 5,121,458 A | 6/1992 | Nilsson et al. |
| 5,142,598 A | 8/1992 | Tabone |
| D330,368 S | 10/1992 | Bourgeois et al. |
| 5,189,410 A | 2/1993 | Kosugi et al. |
| 5,204,929 A | 4/1993 | Machall et al. |
| 5,209,441 A | 5/1993 | Satoh |
| 5,210,374 A | 5/1993 | Channell |
| 5,214,735 A | 5/1993 | Henneberger et al. |
| 5,218,664 A | 6/1993 | O'Neill et al. |
| 5,231,687 A | 7/1993 | Handley |
| 5,233,674 A | 8/1993 | Vladic |
| 5,243,679 A | 9/1993 | Sharrow et al. |
| 5,255,161 A | 10/1993 | Knoll et al. |
| 5,260,957 A | 11/1993 | Hakimi et al. |
| 5,261,020 A | 11/1993 | de Jong et al. |
| 5,265,187 A | 11/1993 | Morin et al. |
| 5,271,585 A | 12/1993 | Zetena, Jr. |
| 5,274,731 A | 12/1993 | White |
| 5,287,428 A | 2/1994 | Shibata |
| 5,317,663 A | 5/1994 | Beard et al. |
| 5,323,480 A | 6/1994 | Mullaney et al. |
| 5,333,221 A | 7/1994 | Briggs et al. |
| 5,333,222 A | 7/1994 | Belenkiy et al. |
| 5,348,240 A | 9/1994 | Carmo et al. |
| 5,359,688 A | 10/1994 | Underwood |
| 5,363,465 A | 11/1994 | Korkowski et al. |
| 5,367,598 A | 11/1994 | Devenish, III et al. |
| 5,375,185 A | 12/1994 | Hermsen et al. |
| 5,383,051 A | 1/1995 | Delrosso et al. |
| 5,402,515 A | 3/1995 | Vidacovich et al. |
| 5,408,557 A | 4/1995 | Hsu |
| RE34,955 E | 5/1995 | Anton et al. |
| 5,420,956 A | 5/1995 | Grugel et al. |
| 5,420,958 A | 5/1995 | Henson et al. |
| 5,428,705 A | 6/1995 | Hermsen et al. |
| 5,432,875 A | 7/1995 | Korkowski et al. |
| 5,438,641 A | 8/1995 | Malacarne |
| 5,442,726 A | 8/1995 | Howard et al. |
| 5,448,015 A | 9/1995 | Jamet et al. |
| 5,460,342 A | 10/1995 | Dore et al. |
| 5,473,115 A | 12/1995 | Brownlie et al. |
| 5,479,553 A | 12/1995 | Daems et al. |
| 5,479,554 A | 12/1995 | Roberts |
| 5,490,229 A | 2/1996 | Ghandeharizadeh et al. |
| 5,497,444 A | 3/1996 | Wheeler |
| 5,515,472 A | 5/1996 | Mullaney et al. |
| 5,542,015 A | 7/1996 | Hultermans |
| 5,548,678 A | 8/1996 | Frost et al. |
| 5,553,183 A | 9/1996 | Bechamps |
| 5,553,186 A | 9/1996 | Allen |
| 5,556,060 A | 9/1996 | Bingham et al. |
| 5,559,922 A | 9/1996 | Arnett |
| 5,570,895 A | 11/1996 | McCue et al. |
| 5,590,234 A | 12/1996 | Pulido |
| 5,607,126 A | 3/1997 | Cordola et al. |
| 5,613,030 A | 3/1997 | Hoffer et al. |
| 5,617,501 A | 4/1997 | Miller et al. |
| 5,627,925 A | 5/1997 | Alferness et al. |
| 5,647,043 A | 7/1997 | Anderson et al. |
| 5,649,042 A | 7/1997 | Saito |
| 5,652,814 A | 7/1997 | Pan et al. |
| 5,659,655 A | 8/1997 | Pilatos |
| 5,689,605 A | 11/1997 | Cobb et al. |
| 5,689,607 A | 11/1997 | Vincent et al. |
| 5,692,299 A | 12/1997 | Daems et al. |
| 5,694,511 A | 12/1997 | Pimpinella et al. |
| 5,708,751 A | 1/1998 | Mattei |
| 5,717,810 A | 2/1998 | Wheeler |
| 5,724,469 A | 3/1998 | Orlando |
| 5,731,546 A | 3/1998 | Miles et al. |
| 5,734,776 A | 3/1998 | Puetz |
| 5,751,882 A | 5/1998 | Daems et al. |
| 5,758,004 A | 5/1998 | Alarcon et al. |
| 5,764,843 A | 6/1998 | Macken et al. |
| 5,774,612 A | 6/1998 | Belenkiy et al. |
| 5,775,648 A | 7/1998 | Metzger |
| 5,778,132 A | 7/1998 | Csipkes et al. |
| 5,781,678 A | 7/1998 | Sano et al. |
| 5,793,920 A | 8/1998 | Wilkins et al. |
| 5,793,921 A | 8/1998 | Wilkins et al. |
| 5,796,908 A | 8/1998 | Vicory |
| 5,802,237 A | 9/1998 | Pulido |
| 5,810,461 A | 9/1998 | Ive et al. |
| 5,816,081 A | 10/1998 | Johnston |
| 5,823,646 A | 10/1998 | Arizpe et al. |
| 5,825,955 A | 10/1998 | Ernst et al. |
| 5,825,961 A | 10/1998 | Wilkins et al. |
| 5,832,162 A | 11/1998 | Sarbell |
| 5,835,657 A | 11/1998 | Suarez et al. |
| 5,835,658 A | 11/1998 | Smith |
| 5,862,290 A | 1/1999 | Burek et al. |
| 5,867,621 A | 2/1999 | Luther et al. |
| 5,870,519 A | 2/1999 | Jenkins et al. |
| 5,880,864 A | 3/1999 | Williams et al. |
| 5,881,200 A | 3/1999 | Burt |
| 5,883,995 A | 3/1999 | Lu |
| 5,884,003 A | 3/1999 | Cloud et al. |
| 5,892,877 A | 4/1999 | Meyerhoefer |

(56) References Cited

U.S. PATENT DOCUMENTS

| | | |
|---|---|---|
| 5,909,526 A | 6/1999 | Roth et al. |
| 5,930,425 A | 7/1999 | Abel et al. |
| 5,945,633 A | 8/1999 | Ott et al. |
| 5,946,440 A | 8/1999 | Puetz |
| 5,956,439 A | 9/1999 | Pimpinella |
| 5,956,444 A | 9/1999 | Duda et al. |
| 5,969,294 A | 10/1999 | Eberle et al. |
| 5,975,769 A | 11/1999 | Larson et al. |
| 5,978,540 A | 11/1999 | Bechamps et al. |
| 6,009,225 A | 12/1999 | Ray et al. |
| 6,027,252 A | 2/2000 | Erdman et al. |
| 6,044,193 A | 3/2000 | Szentesi et al. |
| 6,059,215 A | 5/2000 | Finnis |
| 6,061,492 A | 5/2000 | Strause et al. |
| 6,065,968 A | 5/2000 | Corliss |
| 6,079,881 A | 6/2000 | Roth |
| D427,897 S | 7/2000 | Johnston et al. |
| 6,118,075 A | 9/2000 | Baker et al. |
| 6,129,221 A | 10/2000 | Shaha |
| 6,149,315 A | 11/2000 | Stephenson |
| 6,151,436 A | 11/2000 | Burek et al. |
| 6,160,946 A | 12/2000 | Thompson et al. |
| D436,027 S | 1/2001 | Johnston et al. |
| 6,175,079 B1 | 1/2001 | Johnston et al. |
| 6,188,687 B1 | 2/2001 | Mussman et al. |
| 6,188,825 B1 | 2/2001 | Bandy et al. |
| 6,192,180 B1 | 2/2001 | Kim et al. |
| 6,208,796 B1 | 3/2001 | Williams Vigliaturo |
| 6,215,938 B1 | 4/2001 | Reitmeier et al. |
| 6,226,111 B1 | 5/2001 | Chang et al. |
| 6,227,717 B1 | 5/2001 | Ott et al. |
| 6,234,683 B1 | 5/2001 | Waldron et al. |
| 6,236,795 B1 | 5/2001 | Rodgers |
| 6,240,229 B1 | 5/2001 | Roth |
| 6,243,526 B1 | 6/2001 | Garibay et al. |
| 6,259,851 B1 | 7/2001 | Daoud |
| 6,263,136 B1 | 7/2001 | Jennings et al. |
| 6,263,141 B1 | 7/2001 | Smith |
| 6,269,212 B1 | 7/2001 | Schiattone |
| 6,275,640 B1 | 8/2001 | Hunsinger et al. |
| 6,275,641 B1 | 8/2001 | Daoud |
| 6,278,829 B1 | 8/2001 | BuAbbud et al. |
| 6,278,831 B1 | 8/2001 | Henderson et al. |
| 6,289,159 B1 | 9/2001 | Van Hees et al. |
| 6,292,614 B1 | 9/2001 | Smith et al. |
| 6,304,707 B1 | 10/2001 | Daems et al. |
| 6,307,997 B1 | 10/2001 | Walters et al. |
| 6,307,998 B2 | 10/2001 | Williams Vigliaturo |
| 6,311,007 B1 | 10/2001 | Daoud |
| RE37,489 E | 1/2002 | Anton et al. |
| 6,343,313 B1 | 1/2002 | Salesky et al. |
| 6,347,888 B1 | 2/2002 | Puetz |
| 6,353,697 B1 | 3/2002 | Daoud |
| 6,359,228 B1 | 3/2002 | Strause et al. |
| 6,363,183 B1 | 3/2002 | Koh |
| 6,363,200 B1 | 3/2002 | Thompson et al. |
| 6,370,294 B1 | 4/2002 | Pfeiffer et al. |
| 6,385,381 B1 | 5/2002 | Janus et al. |
| 6,397,166 B1 | 5/2002 | Leung et al. |
| 6,411,767 B1 | 6/2002 | Burrous et al. |
| 6,418,262 B1 | 7/2002 | Puetz et al. |
| 6,424,781 B1 | 7/2002 | Puetz et al. |
| 6,424,782 B1 | 7/2002 | Ray |
| 6,425,694 B1 | 7/2002 | Szilagyi et al. |
| 6,427,035 B1 | 7/2002 | Mahony |
| 6,431,762 B1 | 8/2002 | Taira et al. |
| 6,434,313 B1 | 8/2002 | Clapp, Jr. et al. |
| 6,434,316 B1 | 8/2002 | Grois et al. |
| 6,438,310 B1 | 8/2002 | Lance et al. |
| 6,439,780 B1 | 8/2002 | Mudd et al. |
| D463,253 S | 9/2002 | Canty |
| 6,452,925 B1 | 9/2002 | Sistanizadeh et al. |
| 6,456,772 B1 | 9/2002 | Daoud |
| 6,464,402 B1 | 10/2002 | Andrews et al. |
| D466,087 S | 11/2002 | Cuny et al. |
| 6,480,487 B1 | 11/2002 | Wegleitner et al. |
| 6,480,660 B1 | 11/2002 | Reitmeier et al. |
| 6,483,977 B2 | 11/2002 | Battey et al. |
| 6,484,991 B2 | 11/2002 | Sher |
| 6,496,640 B1 | 12/2002 | Harvey et al. |
| 6,499,608 B1 | 12/2002 | Sterling et al. |
| D468,996 S | 1/2003 | Sarkinen et al. |
| 6,507,691 B1 | 1/2003 | Hunsinger et al. |
| 6,522,814 B2 * | 2/2003 | Yoshida et al. ............... 385/100 |
| 6,532,332 B2 | 3/2003 | Solheid et al. |
| 6,535,682 B1 | 3/2003 | Puetz et al. |
| 6,539,155 B1 | 3/2003 | Broeng et al. |
| 6,539,160 B2 | 3/2003 | Battey et al. |
| 6,542,652 B1 | 4/2003 | Mahony |
| 6,542,688 B1 | 4/2003 | Battey et al. |
| 6,543,100 B1 | 4/2003 | Finley et al. |
| 6,554,485 B1 | 4/2003 | Beatty et al. |
| 6,556,738 B2 | 4/2003 | Pfeiffer et al. |
| 6,556,763 B1 | 4/2003 | Puetz et al. |
| 6,567,601 B2 | 5/2003 | Daoud et al. |
| 6,571,047 B1 | 5/2003 | Yarkosky et al. |
| 6,577,595 B1 | 6/2003 | Counterman |
| 6,577,801 B2 | 6/2003 | Broderick et al. |
| 6,579,014 B2 | 6/2003 | Melton et al. |
| 6,580,867 B2 | 6/2003 | Galaj et al. |
| 6,581,788 B1 | 6/2003 | Winig et al. |
| 6,591,051 B2 | 7/2003 | Solheid et al. |
| 6,594,434 B1 | 7/2003 | Davidson et al. |
| 6,597,670 B1 | 7/2003 | Tweedy et al. |
| 6,598,949 B2 | 7/2003 | Frazier et al. |
| 6,612,515 B1 | 9/2003 | Tinucci et al. |
| 6,614,953 B2 | 9/2003 | Strasser et al. |
| 6,614,974 B2 | 9/2003 | Elrefaie et al. |
| 6,614,980 B1 | 9/2003 | Mahony |
| 6,621,952 B1 | 9/2003 | Pi et al. |
| 6,621,975 B2 | 9/2003 | Laporte et al. |
| 6,625,374 B2 | 9/2003 | Holman et al. |
| 6,625,375 B1 | 9/2003 | Mahony |
| 6,631,237 B2 | 10/2003 | Knudsen et al. |
| 6,633,717 B1 | 10/2003 | Knight et al. |
| 6,640,028 B1 | 10/2003 | Schroll et al. |
| RE38,311 E | 11/2003 | Wheeler |
| 6,652,163 B2 | 11/2003 | Fajardo et al. |
| 6,654,536 B2 | 11/2003 | Battey et al. |
| 6,668,127 B1 | 12/2003 | Mahony |
| 6,710,366 B1 | 3/2004 | Lee et al. |
| 6,711,339 B2 | 3/2004 | Puetz et al. |
| 6,715,619 B2 | 4/2004 | Kim et al. |
| 6,741,784 B1 | 5/2004 | Guan |
| D491,286 S | 6/2004 | Winig et al. |
| D491,287 S | 6/2004 | Winig et al. |
| D491,449 S | 6/2004 | Winig et al. |
| 6,748,155 B2 | 6/2004 | Kim et al. |
| 6,760,531 B1 | 7/2004 | Solheid et al. |
| 6,766,094 B2 | 7/2004 | Smith et al. |
| D495,067 S | 8/2004 | Winig et al. |
| 6,778,752 B2 | 8/2004 | Laporte et al. |
| 6,792,191 B1 | 9/2004 | Clapp, Jr. et al. |
| 6,795,633 B2 | 9/2004 | Joseph, II |
| 6,801,695 B2 | 10/2004 | Lanier et al. |
| 6,802,724 B1 | 10/2004 | Mahony |
| 6,809,258 B1 | 10/2004 | Dang et al. |
| D498,005 S | 11/2004 | Winig et al. |
| 6,816,661 B1 | 11/2004 | Barnes et al. |
| 6,819,856 B2 | 11/2004 | Dagley et al. |
| 6,819,857 B2 | 11/2004 | Douglas et al. |
| 6,845,207 B2 | 1/2005 | Schray et al. |
| 6,850,685 B2 | 2/2005 | Tinucci et al. |
| 6,865,334 B2 | 3/2005 | Cooke et al. |
| 6,870,734 B2 | 3/2005 | Mertesdorf et al. |
| 6,870,997 B2 | 3/2005 | Cooke et al. |
| 6,879,545 B2 | 4/2005 | Cooke et al. |
| 6,880,982 B2 | 4/2005 | Imamura |
| 6,885,798 B2 | 4/2005 | Zimmel |
| 6,915,058 B2 | 7/2005 | Pons |
| 6,920,273 B2 | 7/2005 | Knudsen |
| 6,920,274 B2 | 7/2005 | Rapp et al. |
| 6,925,241 B2 | 8/2005 | Bohle et al. |
| 6,925,852 B2 | 8/2005 | Susko |

(56) References Cited

U.S. PATENT DOCUMENTS

| | | |
|---|---|---|
| 6,934,451 B2 | 8/2005 | Cooke et al. |
| 6,946,605 B2 | 9/2005 | Levesque et al. |
| 6,968,107 B2 | 11/2005 | Belardi et al. |
| 6,983,095 B2 | 1/2006 | Reagan et al. |
| 6,986,608 B2 | 1/2006 | Choudhury et al. |
| 6,993,228 B2 | 1/2006 | Burke, Jr. et al. |
| 7,006,748 B2 | 2/2006 | Dagley et al. |
| 7,027,695 B2 | 4/2006 | Cooke et al. |
| 7,054,513 B2 | 5/2006 | Herz et al. |
| 7,068,907 B2 | 6/2006 | Schray |
| 7,083,051 B2 | 8/2006 | Smith et al. |
| 7,088,891 B2 | 8/2006 | Jung et al. |
| 7,110,654 B2 | 9/2006 | Dillat |
| 7,120,347 B2 * | 10/2006 | Blackwell et al. ........... 385/135 |
| 7,130,519 B2 | 10/2006 | Grubish et al. |
| 7,142,763 B2 | 11/2006 | Frohlich et al. |
| 7,155,106 B2 | 12/2006 | Cianciotto et al. |
| 7,171,121 B1 | 1/2007 | Skarica et al. |
| 7,181,142 B1 | 2/2007 | Xu et al. |
| 7,200,316 B2 | 4/2007 | Giraud et al. |
| 7,200,317 B2 | 4/2007 | Reagan et al. |
| 7,201,595 B1 | 4/2007 | Morello |
| 7,215,865 B2 | 5/2007 | Bellekens et al. |
| 7,218,828 B2 | 5/2007 | Feustel et al. |
| 7,245,811 B2 | 7/2007 | Takeda et al. |
| 7,260,302 B2 | 8/2007 | Caveney |
| 7,264,402 B2 | 9/2007 | Theuerkorn et al. |
| 7,266,283 B2 | 9/2007 | Kline et al. |
| 7,272,291 B2 | 9/2007 | Bayazit et al. |
| 7,274,852 B1 | 9/2007 | Smrha et al. |
| 7,280,733 B2 | 10/2007 | Larson et al. |
| 7,289,731 B2 | 10/2007 | Thinguldstad |
| 7,298,951 B2 | 11/2007 | Smrha et al. |
| 7,302,153 B2 | 11/2007 | Thom |
| 7,310,471 B2 | 12/2007 | Bayazit et al. |
| 7,330,629 B2 | 2/2008 | Cooke et al. |
| 7,331,722 B2 | 2/2008 | Tan |
| 7,349,616 B1 | 3/2008 | Castonguay et al. |
| 7,376,325 B1 | 5/2008 | Cloud et al. |
| 7,379,650 B2 | 5/2008 | Weinert et al. |
| 7,406,241 B1 | 7/2008 | Opaluch et al. |
| 7,412,145 B2 | 8/2008 | Honma et al. |
| 7,418,184 B1 | 8/2008 | Gonzales et al. |
| 7,421,182 B2 | 9/2008 | Bayazit et al. |
| 7,450,806 B2 | 11/2008 | Bookbinder et al. |
| 7,460,757 B2 | 12/2008 | Hoehne et al. |
| 7,471,867 B2 | 12/2008 | Vogel et al. |
| 7,477,826 B2 | 1/2009 | Mullaney et al. |
| 7,509,016 B2 | 3/2009 | Smith et al. |
| 7,522,805 B2 | 4/2009 | Smith et al. |
| 7,526,174 B2 | 4/2009 | Leon et al. |
| 7,609,967 B2 | 10/2009 | Hochbaum et al. |
| 7,613,376 B2 | 11/2009 | Wright et al. |
| 7,636,507 B2 | 12/2009 | Lu et al. |
| 7,766,732 B2 | 8/2010 | Hauville |
| 7,769,265 B2 | 8/2010 | Cairns |
| 7,970,249 B2 | 6/2011 | Solheid et al. |
| 7,974,509 B2 | 7/2011 | Smith et al. |
| 8,086,085 B2 | 12/2011 | Lu et al. |
| 8,265,447 B2 | 9/2012 | Loeffelholz et al. |
| 8,351,754 B2 * | 1/2013 | Bell ........................... 385/135 |
| 8,437,595 B2 | 5/2013 | Womack et al. |
| 2001/0001270 A1 | 5/2001 | Williams Vigliaturo |
| 2002/0034290 A1 | 3/2002 | Pershan |
| 2002/0037136 A1 | 3/2002 | Wang et al. |
| 2002/0051616 A1 | 5/2002 | Battey et al. |
| 2002/0118929 A1 | 8/2002 | Brun et al. |
| 2002/0148846 A1 | 10/2002 | Luburic |
| 2002/0150372 A1 | 10/2002 | Schray |
| 2002/0180163 A1 | 12/2002 | Muller et al. |
| 2002/0181896 A1 | 12/2002 | McClellan et al. |
| 2002/0181905 A1 | 12/2002 | Yoshida et al. |
| 2003/0031419 A1 | 2/2003 | Simmons et al. |
| 2003/0063866 A1 | 4/2003 | Melton et al. |
| 2003/0063875 A1 | 4/2003 | Bickham et al. |
| 2003/0095774 A1 | 5/2003 | Bohme et al. |
| 2003/0103750 A1 | 6/2003 | Laporte et al. |
| 2003/0132685 A1 | 7/2003 | Sucharczuk et al. |
| 2003/0134541 A1 | 7/2003 | Johnsen et al. |
| 2003/0142946 A1 | 7/2003 | Saito et al. |
| 2003/0147597 A1 | 8/2003 | Duran |
| 2003/0174996 A1 | 9/2003 | Henschel et al. |
| 2003/0185535 A1 | 10/2003 | Tinucci et al. |
| 2003/0194187 A1 | 10/2003 | Simmons et al. |
| 2003/0223725 A1 | 12/2003 | Laporte et al. |
| 2004/0001686 A1 | 1/2004 | Smith et al. |
| 2004/0013390 A1 | 1/2004 | Kim et al. |
| 2004/0042710 A1 | 3/2004 | Margalit et al. |
| 2004/0074852 A1 | 4/2004 | Knudsen et al. |
| 2004/0081404 A1 | 4/2004 | Elliott |
| 2004/0084465 A1 | 5/2004 | Luburic |
| 2004/0109660 A1 | 6/2004 | Liberty |
| 2004/0123998 A1 | 7/2004 | Berglund et al. |
| 2004/0146266 A1 | 7/2004 | Solheid et al. |
| 2004/0150267 A1 | 8/2004 | Ferguson |
| 2004/0175090 A1 | 9/2004 | Vastmans et al. |
| 2004/0218970 A1 | 11/2004 | Caveney et al. |
| 2004/0228598 A1 | 11/2004 | Allen et al. |
| 2004/0240825 A1 | 12/2004 | Daoud et al. |
| 2004/0264873 A1 | 12/2004 | Smith et al. |
| 2005/0002633 A1 | 1/2005 | Solheid et al. |
| 2005/0036749 A1 | 2/2005 | Vogel et al. |
| 2005/0100301 A1 | 5/2005 | Solheid et al. |
| 2005/0123261 A1 | 6/2005 | Bellekens et al. |
| 2005/0129379 A1 | 6/2005 | Reagan et al. |
| 2005/0152306 A1 | 7/2005 | Bonnassieux et al. |
| 2005/0213921 A1 | 9/2005 | Mertesdorf et al. |
| 2005/0232565 A1 | 10/2005 | Heggestad et al. |
| 2005/0238290 A1 | 10/2005 | Choudhury et al. |
| 2005/0265683 A1 | 12/2005 | Cianciotto et al. |
| 2005/0276562 A1 | 12/2005 | Battey et al. |
| 2005/0281526 A1 | 12/2005 | Vongseng et al. |
| 2006/0029334 A1 | 2/2006 | Quinby et al. |
| 2006/0049941 A1 | 3/2006 | Hunter et al. |
| 2006/0072892 A1 | 4/2006 | Serrander et al. |
| 2006/0083461 A1 | 4/2006 | Takahashi et al. |
| 2006/0083468 A1 | 4/2006 | Kahle et al. |
| 2006/0093278 A1 | 5/2006 | Elkins, II et al. |
| 2006/0093301 A1 | 5/2006 | Zimmel et al. |
| 2006/0093303 A1 | 5/2006 | Reagan et al. |
| 2006/0098931 A1 | 5/2006 | Sibley et al. |
| 2006/0133753 A1 | 6/2006 | Nelson et al. |
| 2006/0153516 A1 | 7/2006 | Napiorkowski et al. |
| 2006/0153517 A1 | 7/2006 | Reagan et al. |
| 2006/0165364 A1 | 7/2006 | Frohlich et al. |
| 2006/0182407 A1 | 8/2006 | Caveney |
| 2006/0193590 A1 | 8/2006 | Puetz et al. |
| 2006/0210229 A1 | 9/2006 | Scadden |
| 2006/0210230 A1 | 9/2006 | Kline et al. |
| 2006/0215980 A1 | 9/2006 | Bayazit et al. |
| 2006/0251373 A1 | 11/2006 | Hodge et al. |
| 2006/0263029 A1 | 11/2006 | Mudd et al. |
| 2006/0269205 A1 | 11/2006 | Zimmel |
| 2006/0269206 A1 | 11/2006 | Zimmel |
| 2006/0269208 A1 | 11/2006 | Allen et al. |
| 2006/0275007 A1 | 12/2006 | Livingston et al. |
| 2006/0275008 A1 | 12/2006 | Xin |
| 2006/0279423 A1 | 12/2006 | Nazari |
| 2006/0285807 A1 | 12/2006 | Lu et al. |
| 2007/0003204 A1 | 1/2007 | Makrides-Saravanos et al. |
| 2007/0003205 A1 | 1/2007 | Saravanos et al. |
| 2007/0023464 A1 | 2/2007 | Barkdoll et al. |
| 2007/0031099 A1 | 2/2007 | Herzog et al. |
| 2007/0031101 A1 | 2/2007 | Kline et al. |
| 2007/0047891 A1 | 3/2007 | Bayazit et al. |
| 2007/0047893 A1 | 3/2007 | Kramer et al. |
| 2007/0047894 A1 | 3/2007 | Holmberg et al. |
| 2007/0052531 A1 | 3/2007 | Mathews et al. |
| 2007/0104447 A1 | 5/2007 | Allen |
| 2007/0114339 A1 | 5/2007 | Winchester |
| 2007/0263962 A1 | 11/2007 | Kohda |
| 2007/0274718 A1 | 11/2007 | Bridges et al. |
| 2008/0063350 A1 | 3/2008 | Trebesch et al. |
| 2008/0085094 A1 | 4/2008 | Krampotich |

(56) References Cited

U.S. PATENT DOCUMENTS

| | | | |
|---|---|---|---|
| 2008/0131067 A1 | 6/2008 | Ugolini et al. | |
| 2008/0138026 A1 | 6/2008 | Yow et al. | |
| 2008/0145008 A1 | 6/2008 | Lewallen et al. | |
| 2008/0193091 A1 | 8/2008 | Herbst | |
| 2008/0253723 A1 | 10/2008 | Stokes et al. | |
| 2008/0259928 A1 | 10/2008 | Chen et al. | |
| 2008/0292261 A1* | 11/2008 | Kowalczyk et al. | 385/135 |
| 2009/0034929 A1 | 2/2009 | Reinhardt et al. | |
| 2009/0060440 A1 | 3/2009 | Wright et al. | |
| 2009/0097813 A1 | 4/2009 | Hill | |
| 2009/0103865 A1 | 4/2009 | Del Rosso | |
| 2009/0103878 A1 | 4/2009 | Zimmel | |
| 2009/0208210 A1 | 8/2009 | Trojer et al. | |
| 2009/0245746 A1 | 10/2009 | Krampotich et al. | |
| 2009/0252462 A1 | 10/2009 | Bonical | |
| 2009/0263122 A1 | 10/2009 | Helkey et al. | |
| 2009/0297111 A1 | 12/2009 | Reagan et al. | |
| 2009/0304342 A1 | 12/2009 | Adomeit et al. | |
| 2009/0324189 A1 | 12/2009 | Hill et al. | |
| 2010/0183274 A1 | 7/2010 | Brunet et al. | |
| 2010/0290753 A1 | 11/2010 | Tang et al. | |
| 2011/0097052 A1 | 4/2011 | Solheid et al. | |
| 2011/0158599 A1 | 6/2011 | Kowalczyk et al. | |
| 2012/0104145 A1 | 5/2012 | Dagley et al. | |
| 2012/0301096 A1 | 11/2012 | Badar et al. | |
| 2012/0308190 A1 | 12/2012 | Smith et al. | |
| 2013/0034333 A1 | 2/2013 | Holmberg et al. | |

FOREIGN PATENT DOCUMENTS

| | | | |
|---|---|---|---|
| DE | 4240727 C1 | 2/1994 | |
| DE | 29800194 U1 | 3/1998 | |
| DE | 10005294 A1 | 8/2001 | |
| DE | 10238189 A1 | 2/2004 | |
| DE | 202004011493 U1 | 9/2004 | |
| DE | 20320702 U1 | 10/2005 | |
| DE | 202005018884 U1 | 2/2006 | |
| DE | 202007012420 U1 | 10/2007 | |
| EP | 0409390 A2 | 1/1991 | |
| EP | 0410622 A2 | 1/1991 | G02B 6/16 |
| EP | 0415647 A2 | 3/1991 | |
| EP | 0490644 A1 | 6/1992 | |
| EP | 0541820 A1 | 5/1993 | |
| EP | 0593927 A1 | 4/1994 | |
| EP | 0720322 A2 | 7/1996 | |
| EP | 0725468 A1 | 8/1996 | |
| EP | 0828356 A2 | 3/1998 | |
| EP | 0840153 A2 | 5/1998 | |
| EP | 0928053 A2 | 7/1999 | |
| EP | 1107031 A1 | 6/2001 | |
| EP | 1120674 A1 | 8/2001 | |
| EP | 1179745 A2 | 2/2002 | |
| EP | 1203974 A2 | 5/2002 | |
| EP | 1316829 A2 | 6/2003 | |
| EP | 1944635 A2 | 7/2008 | |
| EP | 1944886 A1 | 7/2008 | |
| EP | 2141527 A2 | 1/2010 | |
| FR | 2123728 A5 | 9/1972 | |
| FR | 2748576 A1 | 11/1997 | |
| GB | 2254163 A | 9/1992 | |
| JP | 59107317 A | 6/1984 | |
| JP | 6227312 A | 8/1994 | |
| JP | 11125722 A | 5/1999 | |
| JP | 11231163 A | 8/1999 | |
| JP | 2001-116968 A | 4/2001 | G02B 6/44 |
| JP | 2001116968 A | 4/2001 | |
| JP | 2004061713 A | 2/2004 | |
| WO | 8805925 A1 | 8/1988 | |
| WO | 8905989 A1 | 6/1989 | |
| WO | 9507484 A1 | 3/1995 | |
| WO | 9630791 A1 | 10/1996 | |
| WO | 9638752 A1 | 12/1996 | |
| WO | 9725642 A1 | 7/1997 | |
| WO | 9736197 A1 | 10/1997 | |
| WO | 0221186 A1 | 3/2002 | |
| WO | 02099528 A1 | 12/2002 | |
| WO | 03009527 A2 | 1/2003 | |
| WO | 03093889 A1 | 11/2003 | |
| WO | 2004086112 A1 | 10/2004 | |
| WO | 2005020400 A1 | 3/2005 | |
| WO | 2005050277 A2 | 6/2005 | |
| WO | 2005088373 A1 | 9/2005 | |
| WO | 2006050505 A1 | 5/2006 | |
| WO | 2006127457 A1 | 11/2006 | |
| WO | 2006135524 A3 | 12/2006 | |
| WO | 2007050515 A1 | 5/2007 | |
| WO | 2007089682 A2 | 8/2007 | |
| WO | 2007129953 A1 | 11/2007 | |
| WO | 2008033997 A1 | 3/2008 | |
| WO | 2008048935 A2 | 4/2008 | |
| WO | 2008/137894 A1 | 11/2008 | G02B 6/44 |

OTHER PUBLICATIONS

Final Office Action for U.S. Appl. No. 13/094,572 mailed Jul. 8, 2013, 13 pages.
Tanji et al., "Optical Fiber Cabling Technologies for Flexible Access Network," Optical Fiber Technology, Academic Press, London, US, vol. 14, No. 3, Jul. 1, 2008, 8 pages.
Decision on Appeal for U.S. Appl. No. 11/975,440 mailed Nov. 4, 2013, 10 pages.
Advisory Action for U.S. Appl. No. 13/083,110 mailed Nov. 12, 2013, 3 pages.
Advisory Action for U.S. Appl. No. 13/094,572 mailed Oct. 7, 2013, 2 pages.
Advisory Action for U.S. Appl. No. 13/275,798 mailed Sep. 12, 2013, 2 pages.
Non-final Office Action for U.S. Appl. No. 12/417,250 mailed Jun. 23, 2011, 9 pages.
Final Office Action for U.S. Appl. No. 12/417,250 mailed Mar. 3, 2011, 9 pages.
Non-final Office Action for U.S. Appl. No. 12/417,250 mailed Jul. 27, 2010, 11 pages.
Advisory Action for U.S. Appl. No. 12/697,628 mailed Mar. 1, 2012, 3 pages.
Final Office Action for U.S. Appl. No. 12/697,628 mailed Nov. 17, 2011, 15 pages.
Non-final Office Action for U.S. Appl. No. 12/697,628 mailed Apr. 6, 2011, 11 pages.
Final Office Action for U.S. Appl. No. 12/630,938 mailed Jun. 1, 2012, 18 pages.
Non-final Office Action for U.S. Appl. No. 12/630,938 mailed Dec. 19, 2011, 15 pages.
Quayle Action for U.S. Appl. No. 12/861,345 mailed Apr. 9, 2012, 6 pages.
Non-final Office Action for U.S. Appl. No. 12/861,345 mailed Dec. 15, 2011, 10 pages.
Non-final Office Action for U.S. Appl. No. 12/700,837 mailed Jan. 30, 2012, 7 pages.
Final Office Action for U.S. Appl. No. 12/474,866 mailed Jan. 31, 2012, 8 pages.
Non-final Office Action for U.S. Appl. No. 12/474,866 mailed Aug. 5, 2011, 9 pages.
International Search Report for PCT/US2009/066779, Aug. 27, 2010, 3 pages.
International Search Report for PCT/EP2009/000929, Apr. 27, 2009, 4 pages.
Final Office Action for U.S. Appl. No. 12/700,837 mailed Aug. 31, 2012, 10 pages.
International Search Report for PCT/US2007/023631, mailed Apr. 21, 2008, 2 pages.
International Search Report for PCT/US2008/000095 mailed Sep. 12, 2008, 5 pages.
International Search Report for PCT/US2008/002514 mailed Aug. 8, 2008, 2 pages.
International Search Report for PCT/US2008/006798 mailed Oct. 1, 2008, 2 pages.

(56) References Cited

OTHER PUBLICATIONS

Advisory Action for U.S. Appl. No. 12/072,187 mailed Aug. 15, 2011, 2 pages.
Final Office Action for U.S. Appl. No. 12/072,187 mailed Jun. 13, 2011, 21 pages.
Non-final Office Action for U.S. Appl. No. 12/072,187 mailed Nov. 30, 2010, 17 pages.
Non-final Office Action for U.S. Appl. No. 12/892,280 mailed Nov. 6, 2012, 4 pages.
Non-final Office Action for U.S. Appl. No. 13/083,110 mailed Dec. 12, 2012, 9 pages.
International Search Report for PCT/US2009/057140 mailed Nov. 9, 2009, 2 pages.
Examiner's Answer to Appeal Brief for U.S. Appl. No. 12/323,385 mailed Feb. 21, 2013, 11 pages.
Final Office Action for U.S. Appl. No. 12/625,341 mailed Feb. 12, 2013, 10 pages.
Advisory Action for U.S. Appl. No. 12/625,341 mailed Apr. 25, 2013, 6 pages.
Non-final Office Action for U.S. Appl. No. 12/625,341 mailed Oct. 16, 2012, 8 pages.
Non-final Office Action for U.S. Appl. No. 12/323,385 mailed Sep. 21, 2011, 10 pages.
Final Office Action for U.S. Appl. No. 12/323,385 mailed Mar. 6, 2012, 12 pages.
Final Office Action for U.S. Appl. No. 12/751,860 mailed Nov. 5, 2012, 6 pages.
Non-final Office Action for U.S. Appl. No. 12/751,860 mailed Jul. 18, 2012, 8 pages.
Final Office Action for U.S. Appl. No. 13/275,798 mailed Jun. 27, 2013, 10 pages.
Non-final Office Action for U.S. Appl. No. 13/275,798 mailed Mar. 1, 2013, 8 pages.
Final Office Action for U.S. Appl. No. 13/177,233 mailed Mar. 29, 2013, 9 pages.
Advisory Action for U.S. Appl. No. 13/177,233 mailed Jul. 17, 2013, 3 pages.
Non-final Office Action for U.S. Appl. No. 13/177,233 mailed Dec. 17, 2012, 7 pages.
Non-final Office Action for U.S. Appl. No. 10/804,958 mailed Jul. 22, 2009, 8 pages.
Final Office Action for U.S. Appl. No. 10/804,958 mailed Jun. 11, 2008, 9 pages.
Non-final Office Action for U.S. Appl. No. 10/804,958 mailed Aug. 30, 2013, 11 pages.
Notice of Allowance for U.S. Appl. No. 10/804,958 mailed May 24, 2013, 8 pages.
Decision on Appeal for U.S. Appl. No. 10/804,958 mailed Apr. 18, 2013, 9 pages.
Examiner's Answer to Appeal Brief for U.S. Appl. No. 10/804,958 mailed Apr. 29, 2010, 12 pages.
Final Office Action for U.S. Appl. No. 10/804,958 mailed Oct. 9, 2007, 8 pages.
Non-final Office Action for U.S. Appl. No. 10/804,958 mailed Jun. 15, 2007, 7 pages.
Final Office Action for U.S. Appl. No. 10/804,958 mailed Nov. 3, 2006, 7 pages.
Non-final Office Action for U.S. Appl. No. 10/804,958 mailed Apr. 6, 2006, 7 pages.
Non-final Office Action for U.S. Appl. No. 10/804,958 mailed Sep. 21, 2005, 7 pages.
Notice of Allowance for U.S. Appl. No. 11/595,723 mailed Dec. 28, 2010, 8 pages.
Non-final Office Action for U.S. Appl. No. 11/595,723 mailed Jun. 21, 2010, 9 pages.
Non-final Office Action for U.S. Appl. No. 11/595,723 mailed Jan. 5, 2010 9 pages.
Advisory Action for U.S. Appl. No. 11/595,723 mailed Nov. 24, 2009, 3 pages.
Final Office Action for U.S. Appl. No. 11/595,723 mailed Jul. 8, 2009, 13 pages.
Non-final Office Action for U.S. Appl. No. 11/595,723 mailed Sep. 25, 2008, 13 pages.
Final Office Action for U.S. Appl. No. 11/595,723 mailed Apr. 11, 2008, 12 pages.
Non-final Office Action for U.S. Appl. No. 11/595,723 mailed Jun. 7, 2007 18 pages.
Examiner's Answer to Appeal Brief for U.S. Appl. No. 11/975,440 mailed Oct. 22, 2010, 17 pages.
Final Office Action for U.S. Appl. No. 11/975,440 mailed Mar. 8, 2010, 10 pages.
Non-final Office Action for U.S. Appl. No. 11/975,440 mailed Oct. 28, 2009, 7 pages.
Non-final Office Action for U.S. Appl. No. 11/975,440 mailed Jul. 10, 2009, 6 pages.
Notice of Allowance for U.S. Appl. No. 12/566,191 mailed May 24, 2011, 5 pages.
Final Office Action for U.S. Appl. No. 12/566,191 mailed Feb. 15, 2011, 8 pages.
Non-Final Office Action for U.S. Appl. No. 12/566,191 mailed Sep. 30, 2010, 8 pages.
Monro et al., "Holey Fibers with random cladding distributions," Optic Letters, vol. 25, No. 4, Feb. 15, 2000, 3 pages.
Notice of Allowance for U.S. Appl. No. 11/499,572 mailed Jul. 1, 2010, 7 pages.
Advisory Action for U.S. Appl. No. 11/499,572 mailed Jan. 27, 2010, 3 pages.
Final Office Action for U.S. Appl. No. 11/499,572 mailed Aug. 12, 2009, 9 pages.
Advisory Action for U.S. Appl. No. 11/499,572 mailed May 29, 2009, 3 pages.
Final Office Action for U.S. Appl. No. 11/499,572 mailed Dec. 26, 2008, 8 pages.
Non-final Office Action for U.S. Appl. No. 11/499,572 mailed Jun. 13, 2008, 7 pages.
Notice of Allowance for U.S. Appl. No. 12/012,144 mailed Feb. 10, 2009, 6 pages.
Non-final Office Action for U.S. Appl. No. 12/012,144 mailed Jul. 15, 2008, 5 pages.
Notice of Allowance for U.S. Appl. No. 11/712,168 mailed Apr. 21, 2010, 9 pages.
Notice of Allowance for U.S. Appl. No. 11/712,168 mailed Sep. 18, 2009, 9 pages.
Notice of Allowance for U.S. Appl. No. 11/712,168 mailed Jun. 1, 2009, 7 pages.
Notice of Allowance for U.S. Appl. No. 11/712,168 mailed Apr. 7, 2009, 9 pages.
Advisory Action for U.S. Appl. No. 11/712,168 mailed Oct. 20, 2008, 3 pages.
Final Office Action for U.S. Appl. No. 11/712,168 mailed Jul. 24, 2008, 11 pages.
Non-final Office Action for U.S. Appl. No. 11/712,168 mailed Oct. 9, 2007, 7 pages.
Advisory Action for U.S. Appl. No. 11/809,390 mailed Dec. 14, 2009, 2 pages.
Final Office Action for U.S. Appl. No. 11/809,390 mailed Sep. 25, 2009, 12 pages.
Non-final Office Action for U.S. Appl. No. 11/809,390 mailed Mar. 11, 2009, 9 pages.
Notice of Allowance for U.S. Appl. No. 11/809,390 mailed Nov. 18, 2008, 7 pages.
Non-final Office Action for U.S. Appl. No. 11/809,390 mailed Jul. 25, 2008, 10 pages.
Non-final Office Action for U.S. Appl. No. 11/439,070 mailed Jun. 17, 2009, 9 pages.
Non-final Office Action for U.S. Appl. No. 11/439,070 mailed Oct. 17, 2008, 13 pages.
Non-final Office Action for U.S. Appl. No. 11/439,070 mailed Jan. 11, 2008, 11 pages.
Non-final Office Action for U.S. Appl. No. 11/439,070 mailed May 16, 2007, 16 pages.

(56) References Cited

OTHER PUBLICATIONS

Final Office Action for U.S. Appl. No. 12/229,810 mailed Jun. 9, 2011, 16 pages.
Non-final Office Action for U.S. Appl. No. 12/229,810 mailed Dec. 23, 2010, 16 pages.
Final Office Action for U.S. Appl. No. 13/083,110 mailed Aug. 5, 2013, 13 pages.
Notice of Allowance for U.S. Appl. No. 12/417,250 mailed Nov. 9, 2011, 8 pages.
Non-final Office Action for U.S. Appl. No. 13/087,765 mailed Sep. 18, 2013, 8 pages.
Non-final Office Action for U.S. Appl. No. 13/479,846 mailed Sep. 13, 2013, 11 pages.
Final Office Action for U.S. Appl. No. 10/804,958 mailed Mar. 11, 2014, 13 pages.
Notice of Allowance for U.S. Appl. No. 11/975,440 mailed Jan. 15, 2014, 7 pages.
Non-final Office Action for U.S. Appl. No. 12/072,187 mailed Dec. 26, 2013, 25 pages.
Non-final Office Action for U.S. Appl. No. 13/094,572 mailed Mar. 4, 2014, 14 pages.
Final Office Action for U.S. Appl. No. 13/479,846 mailed Feb. 14, 2014, 11 pages.

\* cited by examiner

FIBER OPTIC DISTRIBUTION NETWORK FOR MULTIPLE DWELLING UNITS

CROSS REFERENCE TO RELATED APPLICATIONS

This application is a continuation of International Application No. PCT/US11/28650 filed Mar. 16, 2011, which claims the benefit of priority to U.S. application Ser. No. 61/314,358, filed Mar. 16, 2010, both applications being incorporated herein by reference.

BACKGROUND

Field of the Disclosure

The technology of the disclosure relates to a fiber optic distribution network for indoor applications, particularly for a multiple dwelling unit. The fiber optic network can include a riser cable having tap or connection points for extending the fiber optic network to multiple floors of a multiple dwelling unit.

Technical Background

In the world of the ever-increasing need for broadband bandwidth optical cables have become the main part of telecommunication networks. Optical cables can transmit voice signals, data signals and video signals for very long distances with very high speed. Developments of optic telecommunication networks allow the connection of the end user directly to the optical fiber. This kind of network technology known as FTTH technology (fiber to the home) requires extending an "all optical" communication network closer to the subscribers. As a result such telecommunication networks include large number distribution points from a distribution cable to an end user or subscriber.

One of the key parts of the FTTH network is the last mile connection which often is an indoor installation. Different kind of buildings like multi dwelling units and block of apartment require complicated cabling systems which might mean that there are many separated cables, each one to connect one subscriber. Installation of many cables which provide the connection between a main distribution point (which usually is located in the basement or in another place of the building) and the end user may cause many problems with routing through the wall or levels of the building. As a result, such installations consume a lot of time and costs.

SUMMARY OF THE DETAILED DESCRIPTION

Embodiments disclosed in the detailed description include a fiber optic network for a multiple dwelling unit (MDU) comprising a riser cable preconnectorized with a first riser optical connector. The riser cable is optically connected to a feeder cable providing optical communication service to the MDU. The riser cable has one or more preset mid-span access points along the length of the riser cable. One or more optical fibers of the riser cable extend from the riser cable at the one or more preset mid-span access points and are preconnectorized with a second riser optical connector. A first adapter is located at a lower level of the MDU. The first adapter has a first end and a second end and configured to receive the first riser optical connector at the first end of the first adapter. A second adapter is located at one of the one or more distribution levels. The second adapter has a first end and a second end. A payout reel is adapted to pay out the riser cable such that the riser cable extends between the lower level and at least one of the one or more distribution levels. The second adapter is configured to receive the second riser optical connector at the first end of the second adapter and to optically connect a drop cable via the second end of the second adapter to establish optical connection between the feeder cable, the riser cable and the drop cable. The payout reel is adapted to store a length of the riser cable when the first riser optical connector is received by the first adapter and the second riser optical connector is received by the second adapter.

In another embodiment, a fiber optic network for a multiple dwelling unit (MDU) comprising a riser cable having a first riser multi-fiber connector at one end and a second riser multi-fiber connector at the other end is disclosed. The riser cable is optically connected to a feeder cable providing optical communication service to the MDU. A first multi-fiber adapter is located at a lower level of the MDU. The first multi-fiber adapter has a first end and a second end. The first multi-fiber adapter is configured to receive the first riser multi-fiber connector at the first end of the first multi-fiber adapter. A second multi-fiber adapter is located at one of the one or more distribution levels. The second multi-fiber adapter has a first end and a second end. A payout reel is adapted to payout the riser cable such that the riser cable extends between the lower level and at least one of the one or more distribution levels. The second multi-fiber adapter is configured to receive the second riser multi-fiber connector at the first end of the second multi-fiber adapter and to optically connect a drop cable via the second end of the second multi-fiber adapter to establish optical connection between the feeder cable, the riser cable and the drop cable. The payout reel is adapted to store a length of the riser cable when the first riser multi-fiber connector is received by the first multi-fiber adapter and the second riser multi-fiber connector is received by the second multi-fiber adapter.

In another embodiment, a method for installing a riser cable in a multiple dwelling unit (MDU) is disclosed. The method comprising positioning a payout reel with a riser cable in the MDU; providing a leader having an extending feature for paying out the the riser cable from the payout reel; attaching the extending feature to the riser cable; and extending the leader to one or more distribution levels of the MDU. By extending the leader the riser cable pays out from the payout reel in manner to align with each of the one or more distribution levels to enable an optical connection between an optical fiber in the riser cable and an optical fiber in a drop cable at one of the one or more distribution levels.

DESCRIPTION OF THE DISCLOSURE

Figure 1:
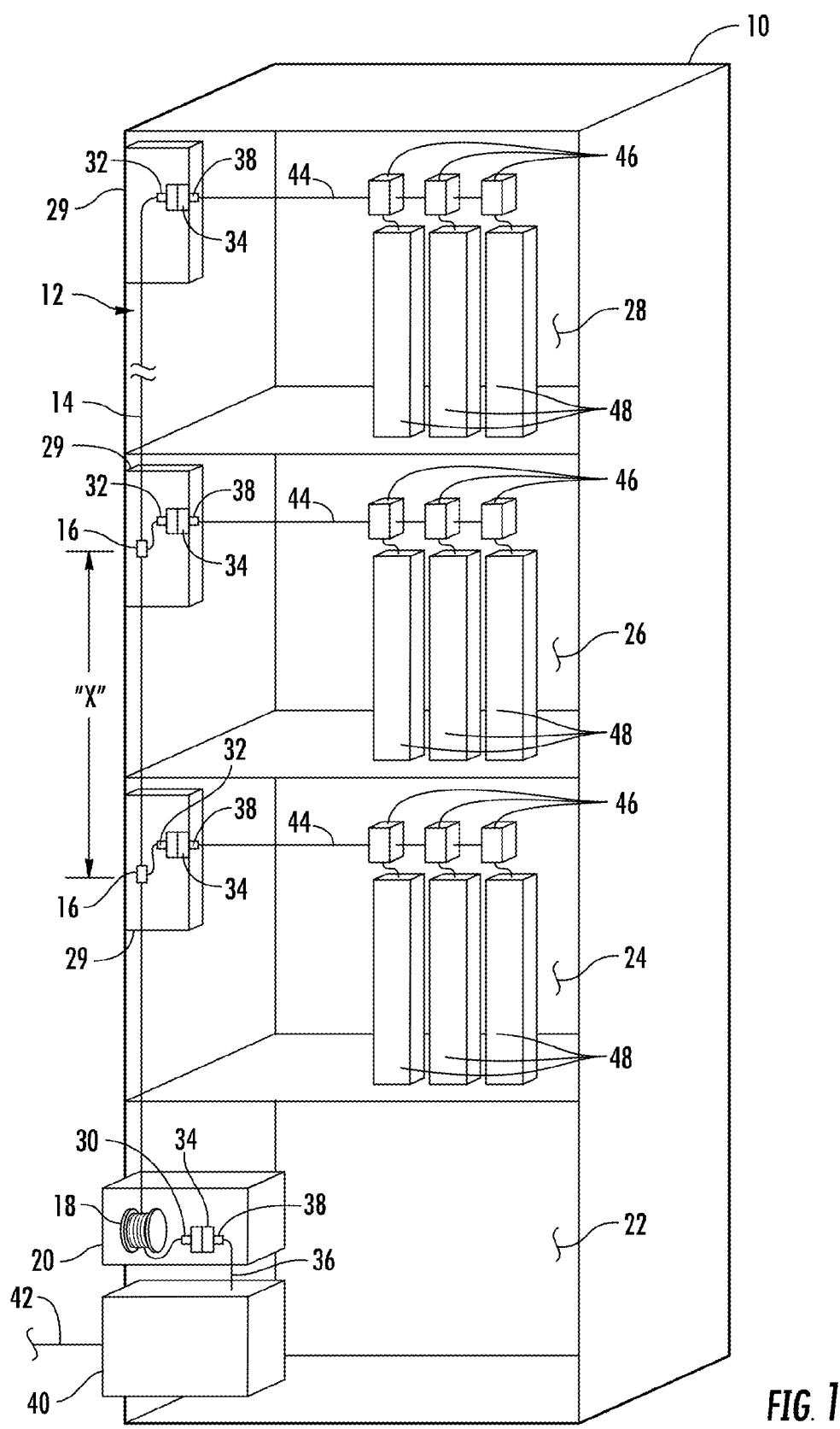
FIG. 1 is a schematic diagram of a perspective elevation view of a multiple dwelling unit (MDU) with an exemplary fiber optic network installed therein, wherein a riser cable with pre-set tap points extends from a payout reel in a patch panel enclosure located at a lower level to multiple distribution levels.

Embodiments disclosed in the detailed description include a fiber optic distribution network for a multi-floor multiple dwelling unit (MDU). The network includes a local convergence point (LCP) which may be located in a lower level of the MDU, for example, the basement. The LCP receives a feeder cable that provides optical communication service to the MDU from a service provider. One or more preconnectorized riser cables having multi-fiber connectors on each end optically connect to the feeder cable through the LCP. The riser cable extends from the LCP to one or more upper distribution levels of the MDU. At the distribution level, the riser cable is received via a network access point, which may be comprised of a fiber distribution terminal (FDT), a mid-span access point, or the like. For purposes herein, the terms network access point may be used to describe either one or more of the FDT and the mid-span access point. Additionally, it should be understood that the terms FDT, pipe-in-box, and closet box will be used to refer and describe a component of the fiber optic distribution network located at the distribution level for optically connecting the riser cable to the drop cable. The term patch panel enclosure will be used when describing the component of the fiber optic distribution network for optically connecting and extending the riser cable to the LCP and, thereby, to the feeder cable.

Optically connecting the riser cable and to the subscriber premises may be through tether cables branched off from the riser cable at each distribution level, for example, at a mid-span access point of the riser cable. The tether cables may be connected to subscriber premises via one or more drop cables at the network access point. Alternatively, or additionally, an individual riser cable may be extended to the distribution level and optically connect to one or more drop cables routed to the subscriber premises. In such case, a tether cable may not be branched off of the riser cable at a mid-span access point. The drop cable extends to the subscriber premises at the distribution level to provide optical communication service to the subscriber. Any riser cable slack may be stored in the FDT, the patch panel enclosure, and/or a separate slack enclosure. Additionally, the riser cable slack may be stored on the payout reel, with the payout reel removably mounted in the FDT, the patch panel enclosure, or the slack enclosure. The slack enclosure may be located at or adjacent to the LCP or at one or more of the distribution levels.

The end of the riser cable would optically connect to the end of one or more drop cables. In either case, the tether cable and/or the riser cable may terminate in a fiber optic connector and optically connect to the drop cable terminated in a fiber optic connector through a suitable fiber optic adapter. The fiber optic adapter may be one that provides for multi-fiber connector to multi-fiber connector interconnection, such as, for example an MTP adapter, or other types of multi-fiber adapters. Additionally or alternatively, the fiber optic adapter may be one that provides for single fiber connector to single fiber connector interconnection, for example an SC adapter, or other types of single fiber adapters. The fiber optic adapters may have dual shutters, one on each end of the adapter. The shutters are adapted to automatically close against the end of the adapter when a fiber optic connector is not inserted in that end of the adapter. In this manner, the shutters may provide sealing of the adapter against the environment, keeping the adapter protected and clean when not in use. The adapter may be keyed up and down to coordinate with the polarity of the connectors. The adapters may be mounted in a cassette or module which is removably mounted in the network access point. Alternatively, the adapter may be removably mounted to a panel which may be removably mounted in the network access point.

As such, the FDT and/or the patch panel enclosure may act as or be a transition box having one or more removably mounted fiber optic adapters configured to receive one or more optical fibers of a riser cable to provide optical communication service from a service provider to a subscriber premises. Additionally, the transition box may have one or more removably mounted payout reels storing the slack of the riser cable or cables paid out in the MDU.

Figure 4:
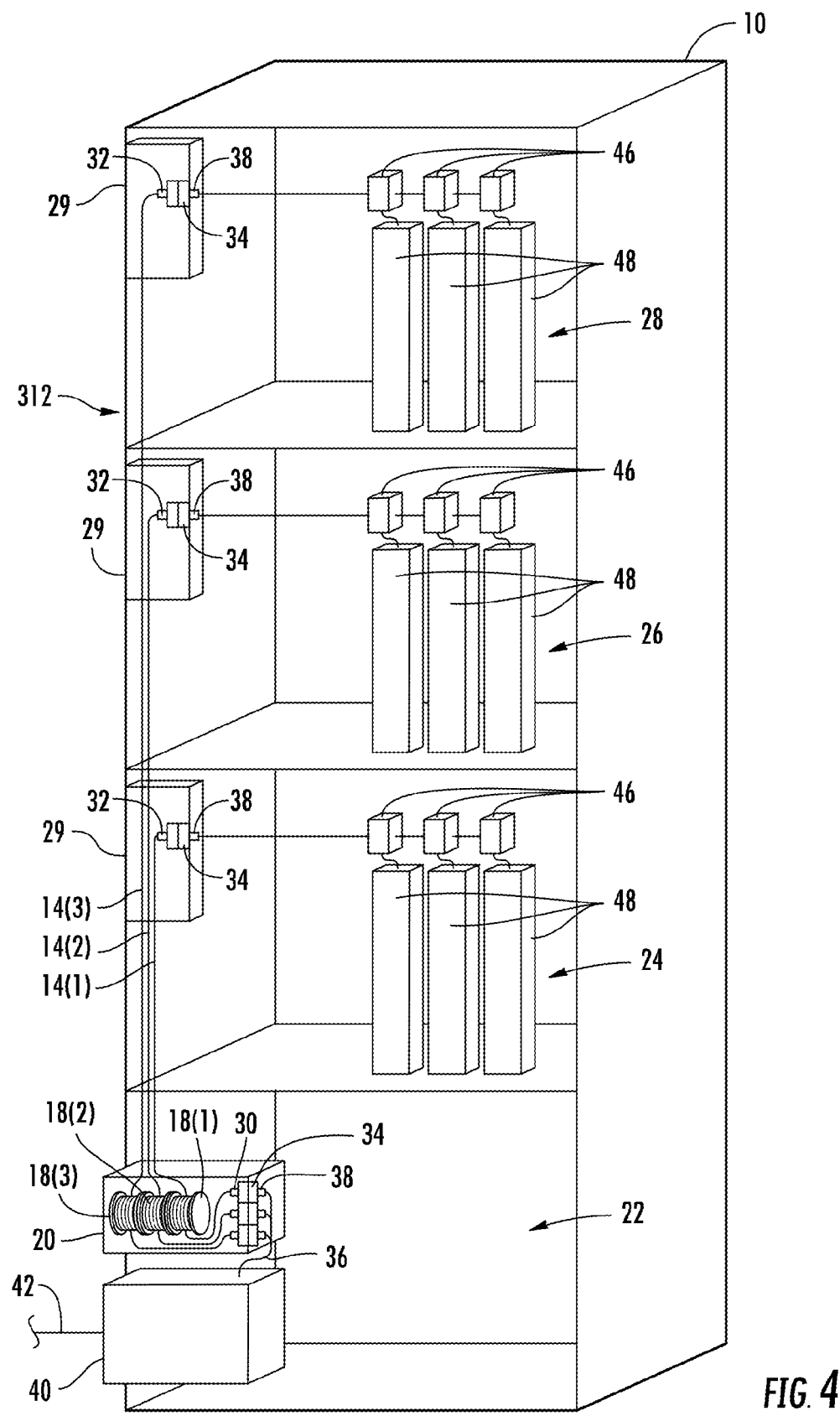
FIG. 4 is a schematic diagram of a perspective elevation view of a MDU with an exemplary fiber optic network installed therein, wherein a plurality of riser cables each extend from a separate payout reel in a patch panel enclosure located at the lower level to one of the distribution levels.
Figure 5:
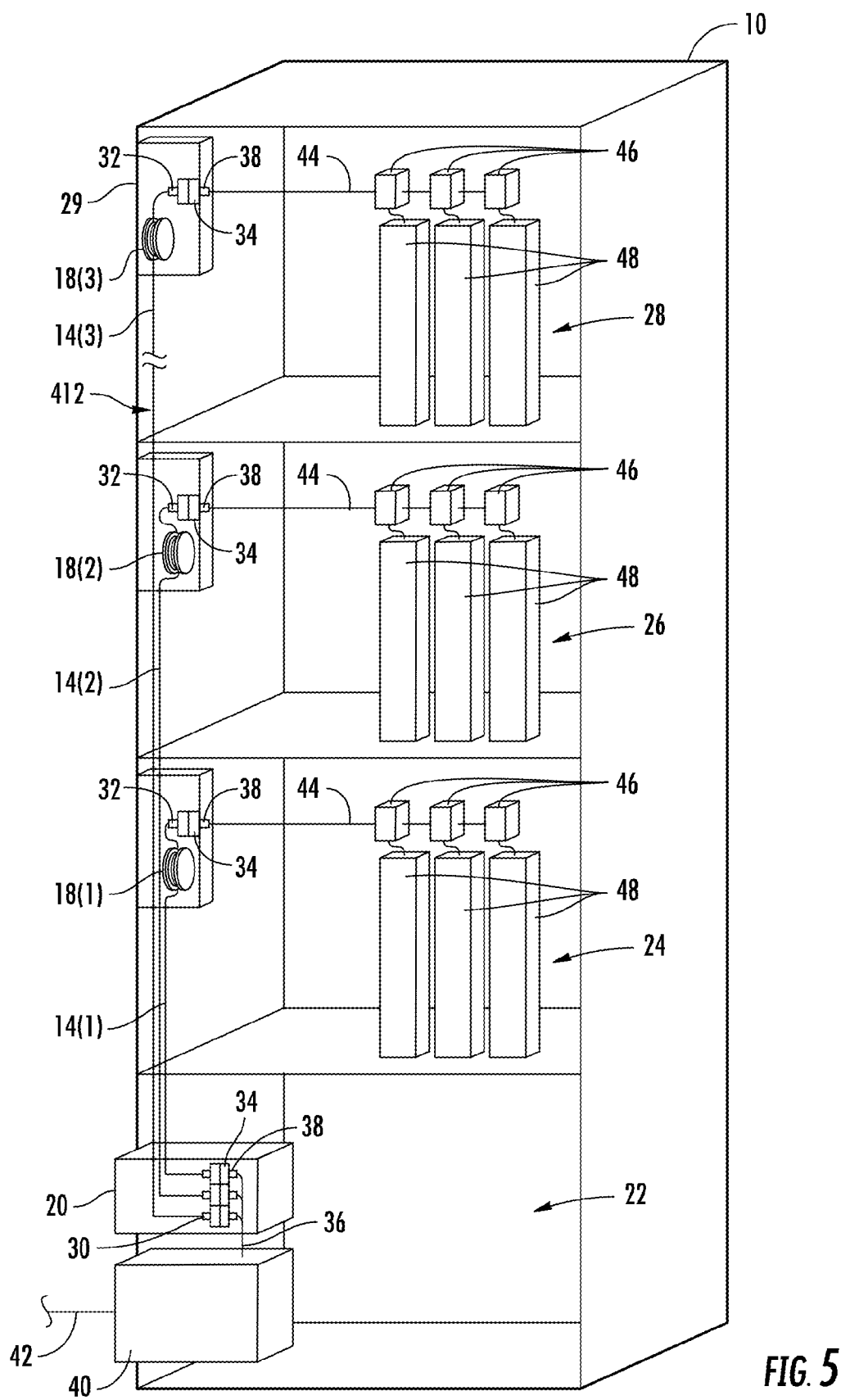
FIG. 5 is a schematic diagram of a perspective elevation view of a MDU with an exemplary fiber optic network installed therein, wherein a plurality of riser cables each extend from a separate FDTs each located at one of the distribution levels to the patch panel enclosure located at the lower level.
Figure 6:
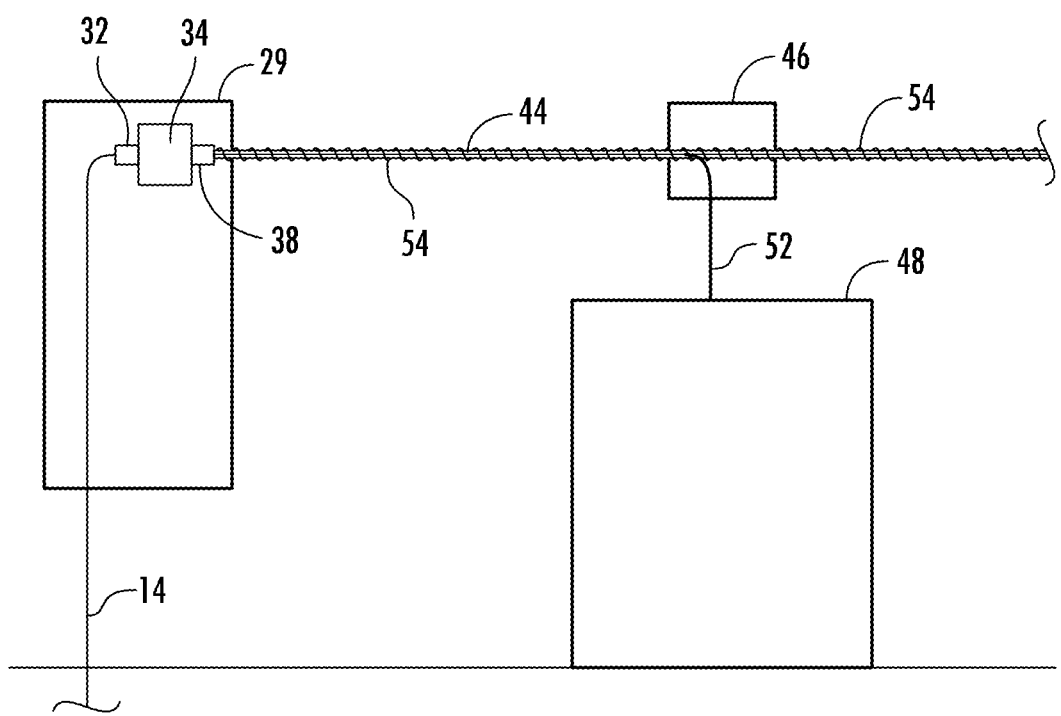
FIG. 6 is a schematic diagram of a bundled drop cable extending from a FDT to a subscriber premises located on a distribution level of the MDU.

In this regard, FIGS. 1-6 illustrate exemplary embodiments of fiber optic networks in an MDU 10. FIGS. 1-5 are schematic diagrams of a perspective elevation views of the MDU 10 with an exemplary fiber optic networks 12, 112, 212, 312, 412 installed therein, extending to distribution levels in the MDU 10. FIG. 6 is a schematic diagram of a bundled drop extending to a subscriber premises at a distribution level of the MDU 10. A distribution level may be designated for one of the floors of the MDU 10, or may be designated for any combination of a number of floors of the MDU 10, or for any portion of a floor of the MDU 10. In FIGS. 1-5, one or more of the riser cables 14 are shown connecting to a local convergence point (LCP) 40 through a patch panel enclosure 20. Alternatively, and although not shown in FIGS. 1-5, the one or more riser cables 14 may connect directly to the LCP 40 without the patch panel enclosure 20.

Referring now to FIG. 1, a riser cable 14 with pre-set mid-span access points 16 extends from a payout reel 18. The mid-span access point 16 may comprise a FlexNAP System, as commercially available from Corning Cable Systems LLC, or other type of connection or system that provides for the separation of one or more optical fibers from the riser cable 14. The riser cable 14 pays out from a payout reel 18. Once the riser cable 14 is paid out from the payout reel 18 to multiple distribution levels 24, 26, 28, the payout reel 18 is removably mounted in a patch panel enclosure 20. Although, in FIG. 1 three higher levels 24, 26, 28 are illustrated, the fiber optic network 12 may have any number of distribution levels. The riser cable 14 is preconnectorized with multi-fiber connectors 30, 32 at each end of the riser cable 14. The patch panel enclosure 20 has a multi-fiber-to-multi-fiber adapter assembly 34 which receives a first multi-fiber connector 30. A distribution cable 36 preconnectorized with a multi-fiber connector 38, is received by and connects to the multi-fiber adapter assembly 34 in the patch panel enclosure 20 to establish an optical connection between the riser cable 14 and the distribution cable 36. The distribution cable 36 routes to a local convergence point (LCP) 40. The LCP 40 receives a feeder cable 42 which provides optical communication service to the MDU 10 from a service provider.

During installation, the riser cable 14 pays out from the payout reel 18 such that the riser cable 14 extends generally in an upward direction from the lower level 22 to each ascending distribution level 24, 26, 28 in succession with distribution level 28 being the highest distribution level in the MDU 10. The mid-span access points 16 are preset such that they are separated by a distance "X" along the length of the riser cable 14. The distance "X" is preset at the factory to a certain value depending on the distance between adjoining distribution levels 24, 26. As examples, the distance "X" may be set at any desired distance, as non-limiting examples, 10 feet, 12 feet, 14 feet, 15 feet, and the like. In this manner, as the riser cable 14 pays out and installed in the MDU 10, the preset mid-span access points will align, generally, with each distribution level 24, 26 of the MDU 10. However, the one exception to this may be the highest distribution level 28, since the end of the riser cable 14 would extend to that level and and would not have a mid-span access point. Any riser cable 14 slack due to the presetting of the distance "X" or otherwise, may be stored on the payout reel 18, in the patch panel enclosure 20, the LCP 40, and/or a slack enclosure (not shown in FIG. 1). Slack may also be stored loosely at the lower level 22, and/or in one ore more fiber distribution terminals 29 located at one or more of the distribution levels 24, 26, 28. Additionally, the payout reel 18 may be removably mounted in the slack housing or may be mounted or located separate from the patch panel enclosure 20 and/or slack enclosure and/or from the FDT 29 at one or more of the distribution levels 24, 26, 28.

The riser cable 14 may be any number of optical fibers, as non-limiting examples, 6, 8, 12 or 24 fibers. At each mid-span access point 16, certain of the optical fibers may be separated or furcated out from the riser cable 14 in a FDT 29 located at the distribution level 24, 26. As non-limiting examples, 6, 8 or 12 fibers may be furcated out from the riser cable 14 and terminated with the second multi-fiber connector 32. At the highest distribution level 28, the optical fibers remaining in the riser cable 14 after furcating out the optical fibers at lower distribution levels 24, 26 are terminated with the second multi-fiber connector 32. The second multi-fiber connector 32 may be received by a multi-fiber adapter assembly 34 removably mounted in the FDT 29 at the distribution level 24, 26, 28. The multi-fiber adapter assembly 34 may be removably mounted in a connector module or panel (not shown in FIG. 1), which may be removably mounted in the FDT 29.

A multi-fiber bundled drop cable 44 preconnectorized with a multi-fiber connector 38, is received by and connects to the multi-fiber adapter assembly 34, or the connector module, as the case may be, in the FDT 29 located at the distribution reel 24, 26, 28. In this manner an optical connection is established between the riser cable 14 and the multi-fiber bundled drop cable 44. The multi-fiber bundled drop cable 44 routes to one or more drop boxes 46 associated with subscriber premises 48 located at the distribution level 24, 26, 28. One or more optical fiber separates from the multi-fiber bundled drop cable 44 at the drop box 46 and extends to the subscriber premises 48. In this manner, optical communication service is provided to the subscriber premises 48.

Alternatively or additionally, one or more connectorized harnesses or jumpers may be connected between the multi-fiber adapters in the multi-fiber adapter assembly 34 and extended to single fiber adapters (not shown in FIG. 1). In such a case, connectorized single fiber drop cables may connect to the harnesses or jumpers to establish optical connection with the riser cable 14, and ultimately to the subscriber premises 48.

Figure 2:
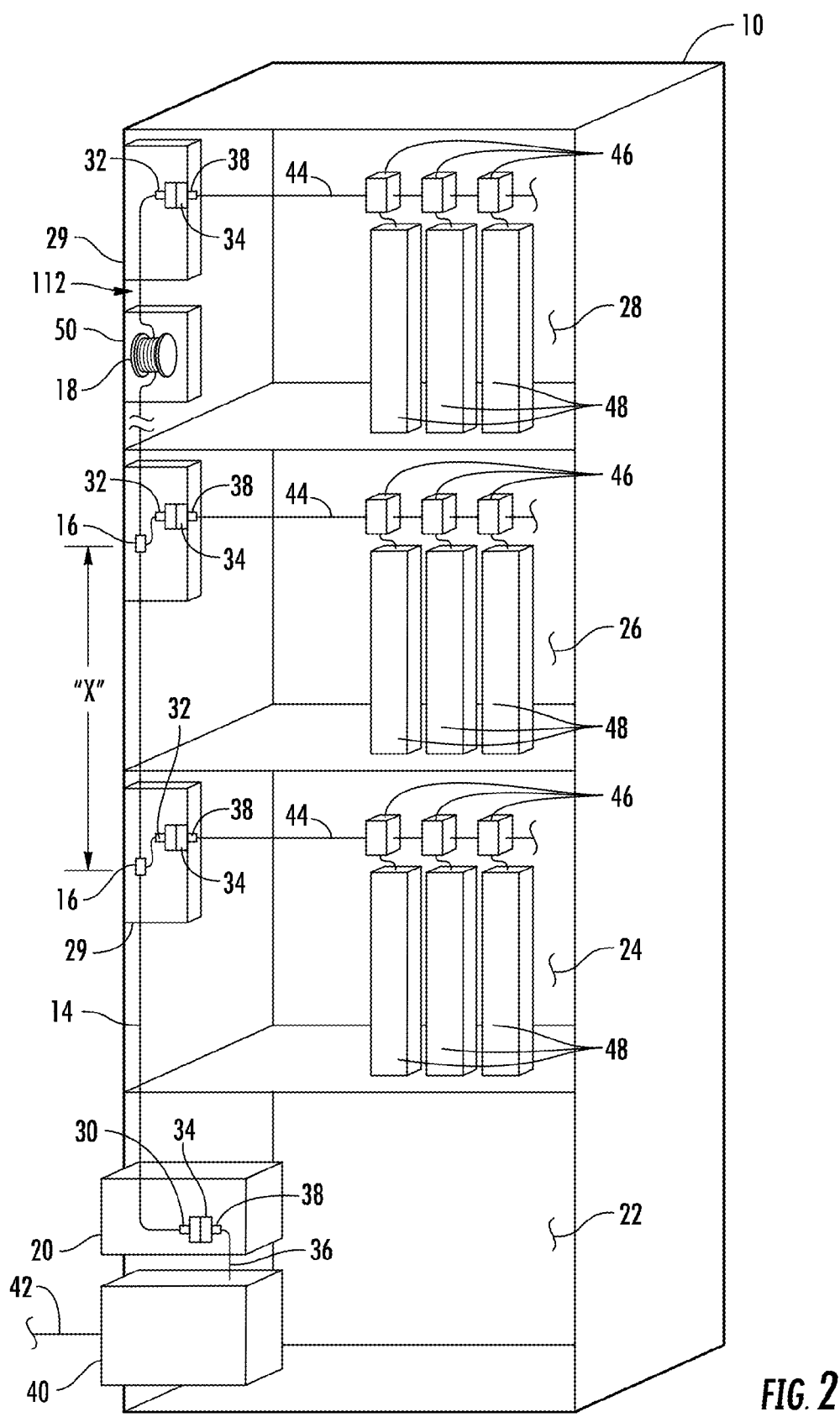
FIG. 2 is a schematic diagram of a perspective elevation view of a MDU with an exemplary fiber optic network installed therein, wherein a riser cable with pre-set tap points extends from a payout reel in a slack enclosure on a distribution level to other distribution levels and to a lower level.

FIG. 2 is a schematic diagram of a perspective elevation view the MDU 10 with an exemplary fiber optic network 112 installed therein. The riser cable 14 with pre-set mid-span access points 16 extends from a payout reel 18 in a separate slack enclosure 50 located at the highest distribution level 28 to the other distribution levels 24, 26 and the the lower level 22. The fiber optic network 112 is similar to fiber optic network 12 shown on FIG. 1, and, therefore, the aspects and/or components of the fiber optic network 112 described with respect to FIG. 1 will not be described again with respect to FIG. 2. In FIG. 2, after the riser cable 14 is paid out, the payout reel 18 is removably mounted in the slack enclosure 50 located at the highest level 28 instead of the patch panel enclosure 20. In this manner, during installation, the riser cable 14 pays out from the payout reel 18 such that the riser cable 14 extends generally in a downward direction from the highest distribution level 28 to each descending distribution level 26, 24 in succession, and to the patch panel enclosure 20.

The patch panel enclosure 20 includes a multi-fiber adapter assembly 34 but may not include the payout reel 18 since that is located at the highest distribution level 28 in fiber optic network 112. However, the multi-fiber adapter assembly 34 in the patch panel enclosure 20 receives the first multi-fiber connector 30 and optically connects it with the multi-fiber connector 38 of the distribution cable 36 to establish an optical connection between the riser cable 14 and the distribution cable 36 as described above with respect to FIG. 1.

Figure 3:
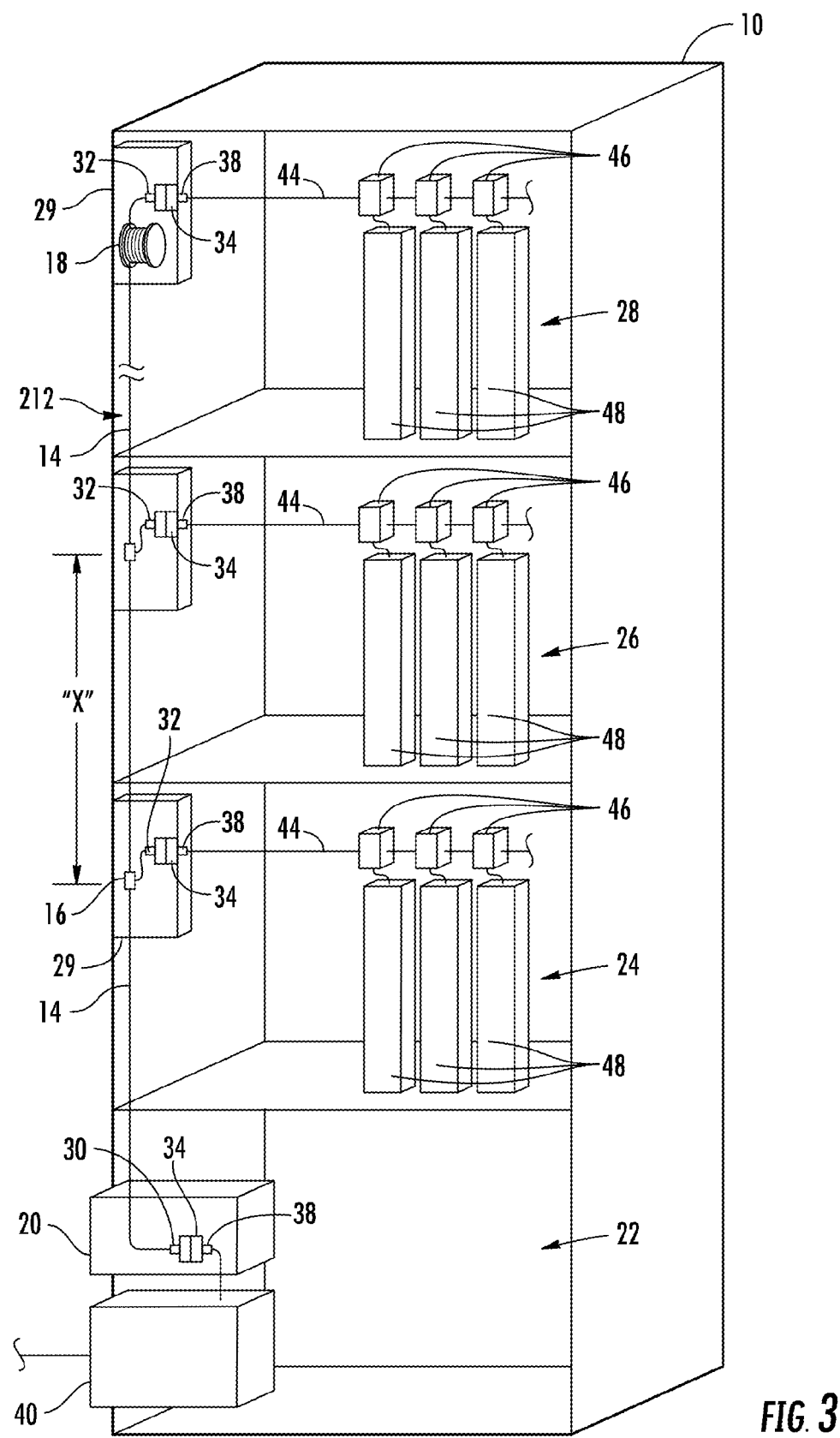
FIG. 3 is a schematic diagram of a perspective elevation view of a MDU with an exemplary fiber optic network installed therein, wherein a riser cable with pre-set tap points extends from a payout reel in a FDT on a distribution level to other distribution levels and the lower level.

FIG. 3 is a schematic diagram of a perspective elevation view of the MDU 10 with an exemplary fiber optic network 212 installed therein. The riser cable 14 with pre-set mid-span access points 16 extends from the payout reel 18 in the FDT 29 located at the highest distribution level 28 to the other distribution levels 24, 26. The fiber optic network 212 is similar to fiber optic network 12 shown on FIG. 1 and the fiber optic network 112 shown on FIG. 2 and, therefore, the aspects and/or components of the fiber optic network 212 described with respect to FIG. 1 and/or FIG. 2 will not be described again with respect to FIG. 3. In FIG. 3, after the riser cable 14 is paid out, the payout reel 18 is removably mounted in the FDT 29 located at the highest distribution level 28 instead of the slack enclosure 50, as described with respect to FIG. 2. In this way, the slack enclosure 50 is not needed at the highest distribution level 28 conserving space. The paying out and installation of the riser cable 14 may be the same as described with respect to FIG. 2.

FIG. 4 is a schematic diagram of a perspective elevation view of the MDU 10 with an exemplary fiber optic network 312 installed therein. A plurality of riser cables 14(1), 14(2), 14(3) each extend from a separate payout reel 18(1), 18(2), 18(3) in the patch panel enclosure 20 and extending to respective ones of the distribution levels 24, 26, 28. Each riser cable 14(1), 14(2), 14(3) pays out from respective payout reels 18(1), 18(2), 18(3). After the riser cable 14(1), 14(2), 14(3) is paid out, the respective payout reel 18(1), 18(2), 18(3) is removably mounted in the patch panel enclosure 20. The riser cables 14(1), 14(2), 14(3) extend generally in an upward direction from the lower level 22 to separate ascending distribution level 24, 26, 28. In this manner, a separate riser cable 14 provides optical service to a separate distribution level 24, 26, 28. Each of the riser cables 14(1), 14(2), 14(3) terminates with respective second multi-fiber connectors 32(1), 32(2), 32(3) which are received by and connected to the respective multi-fiber adapter assembly 34 in the FDT 29 located at the distribution levels 24, 26, 28. In the patch panel enclosure 20, the riser cables 14(1), 14(2), 14(3) extend from each of the payout reels 18(1), 18(2), 18(3) to the multi-fiber adapter assembly 34 located at the patch panel enclosure 20. The first multi-fiber connector 30(1), 30(2), 30(3) of each respective riser cable 14(1), 14(2), 14(3) is received by and connects to the multi-fiber adapter assembly 34 in the patch panel enclosure 20. The distribution cable 36 preconnectorized with a multi-fiber connector 38, is received by and connects to the multi-fiber adapter assembly 34 in the patch panel enclosure 20 to establish an optical connection between the riser cables 14(1), 14(2), 14(3) and the distribution cable 36. The distribution cable 36 routes to the LCP 40.

FIG. 5 is a schematic diagram of a perspective elevation view of the MDU 10 with an exemplary fiber optic network 412 installed therein. The plurality of riser cables 14(1), 14(2), 14(3) each extend from separate, respective FDTs 29 located on one of the distribution levels 24, 26, 28 to the patch panel enclosure 20. The fiber optic network 412 is similar to fiber optic network 312 shown on FIG. 4, and, therefore, the aspects and/or components of the fiber optic network 312 described with respect to FIG. 4 will not be described again with respect to FIG. 5. Each riser cable 14(1), 14(2), 14(3) pays out from respective payout reels 18(1), 18(2), 18(3). After the necessary length of riser cable 14(1), 14(2), 14(3) is paid out, the payout reel 18(1), 18(2), 18(3) is removably mounted in separate, respective FDTS 29 located at respective distribution levels 24, 26, 28. The riser cables 14(1), 14(2), 14(3) extend generally in a downward direction from the respective FDTs 29 located at respective distribution levels 24, 26, 28 to the lower level 22. In this manner, a separate riser cable 14 provides optical service to a separate distribution level 24, 26, 28. Each of the riser cables 14(1), 14(2), 14(3) terminates with respective second multi-fiber connectors 32(1), 32(2), 32(3) which are received by and connected to the respective multi-fiber adapter assembly 34 in the FDT 29 located at the distribution levels 24, 26, 28. In the patch panel enclosure 20, the first multi-fiber connector 30(1), 30(2), 30(3) of each respective riser cable 14(1), 14(2), 14(3) is received by and connects to the multi-fiber adapter assembly 34 in the patch panel enclosure 20. The distribution cable 36 preconnectorized with a multi-fiber connector 38, is received by and connects to the multi-fiber adapter assembly 34 in the patch panel enclosure 20 to establish an optical connection between the riser cables 14(1), 14(2), 14(3) and the distribution cable 36. The distribution cable 36 routes to the LCP 40.

Referring now to FIG. 6, the portion of the fiber optic networks 12, 112, 212, 312, 412 at the distribution level 24, 26, 28 is illustrated. The multi-fiber bundled drop cable 44 extends from the FDT 29 at the distribution level 24, 26, 28 to drop box 46 associated with the and located at the subscriber premises 48. The multi-fiber bundled drop cable 44 includes multiple fiber optic cables 52 retained together by one or more helically wrapped external binders 54. One or more of the multiple fiber optic cables is separated from the multi-fiber bundled drop cable 44 by removing the multiple fiber optic cable from the retainage of the one or more external binders. The separated fiber optic cable 52 may then extend to the subscriber premises 48.

Figures 7, 7A:
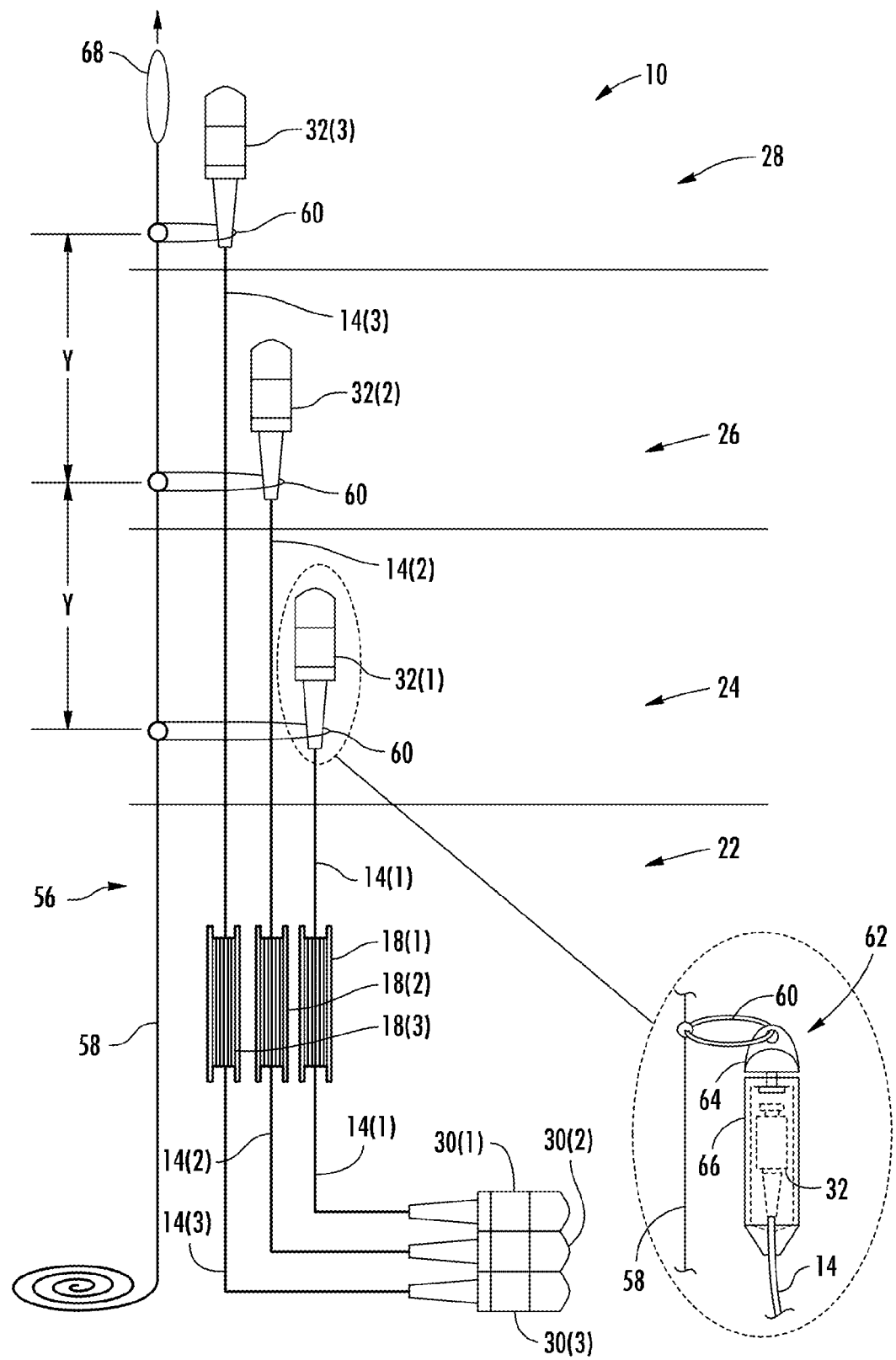
FIG. 7 is a schematic diagram of an elevation view of an exemplary preconnectorized riser cable installation assembly with a plurality of preconnectorized riser cables being extended from payout reels located at a lower level by a leader with extending features attached to the leader at preset locations.
FIG. 7A is a detail view of an exemplary pull device assembly which may be attached to the end of the riser cable to facilitate extending the riser cable from the payout reel.

FIG. 7 is a schematic diagram of an elevation view of an exemplary preconnectorized riser cable installation assembly 56 with a plurality of preconnectorized riser cables 14(1), 14(2), 14(3) being extended from respective payout reels 18(1), 18(2), 18(3) located at a lower level 22 by a leader 58 with extending features 60 attached to the leader 58 at preset locations at a distance "Y" along the length of the leader 58. The extending feature 60 may be any type of loop, hook, swivel, or the like, configured to attach to the second multi-fiber connectors 32(1), 32(2), 32(3), or to some type of pull device attached to the second multi-fiber connectors 32(1), 32(2), 32(3) to provide for safely and effectively paying out the riser cables 14(1), 14(2), 14(3).

FIG. 7A is a detail view of a pull device assembly 62 which may be attached to the end of the riser cable 14 to facilitate extending the riser cable 14 from the payout reel 18. The pull device assembly 62 attaches to the riser cable 14 around the second multi-fiber connector 32 enclosing the second multi-fiber connector 32, boot and a portion of the riser cable 14. The pull device assembly 62 has a swivel end 64 and a body 66. The body 66 may enclose and/or support the second multi-fiber connectors 32. The swivel end 64 is allowed to rotate freely and independently of the body 66 and, therefore, the the second multi-fiber connector 32 and the riser cable 14. The swivel end 64 comprises a hole through which the extending feature 60 inserts. As the riser cable 14 is pulled through the MDU 10 particularly in conduit using a pull loop 68 attached to the end of the leader 58, and the extending feature 60 attached to the swivel end 64, the swivel end 64 it is allowed to independently rotate from the rest of the pull device assembly 62. This independent rotation eliminates twisting of the riser cable 14 and the the second multi-fiber connector 32. In this manner, as the leader 58 is pulled through the MDU 10 particularly in conduit, the leader 58, the extending feature 60 and the swivel end 64 reduce or may eliminate any induce additional torsional stresses on the riser cable 14 and/or the second multi-fiber connector 32.

Referring again to FIG. 7, the distance "Y" is preset to a certain value depending on the distance between adjoining distribution levels 24, 26, 28. As non-limiting examples, the distance "Y" may be set at 10 feet, 12 feet, 14 feet, 15 feet, and the like. In this manner, as the leader 58 is pulled through the MDU 10, riser cables 14(1), 14(2), 14(3) each pays out to a point that will align, generally, with each respective distribution level 24, 26, 28 of the MDU 10. Any riser cable 14 slack due to the presetting of the distance "Y" or otherwise, may be stored on the respective payout reel 18(1), 18(2), 18(3) and/or loosely in an patch panel enclosure 20 and/or a slack enclosure (not shown in FIG. 7). Additionally, slack may be stored loosely, on the payout reels 18(1), 18(2), 18(3) and/or the FDT 29 at one or more of the distribution levels 24, 26, 28. Each second multi-fiber connectors 32(1), 32(2), 32(3), may then be connected to the respective multi-fiber adapter assembly 34 removably mounted in the FDT 29 located at the respective distribution level 24, 26, 28. Additionally, the first multi-fiber connectors 30(1), 30(2), 30(3) attached to respective riser cables 14(1), 14(2), 14(3) may be connected to the respective multi-fiber adapter assembly 34 removably mounted in the patch panel enclosure 20.

Figure 8:
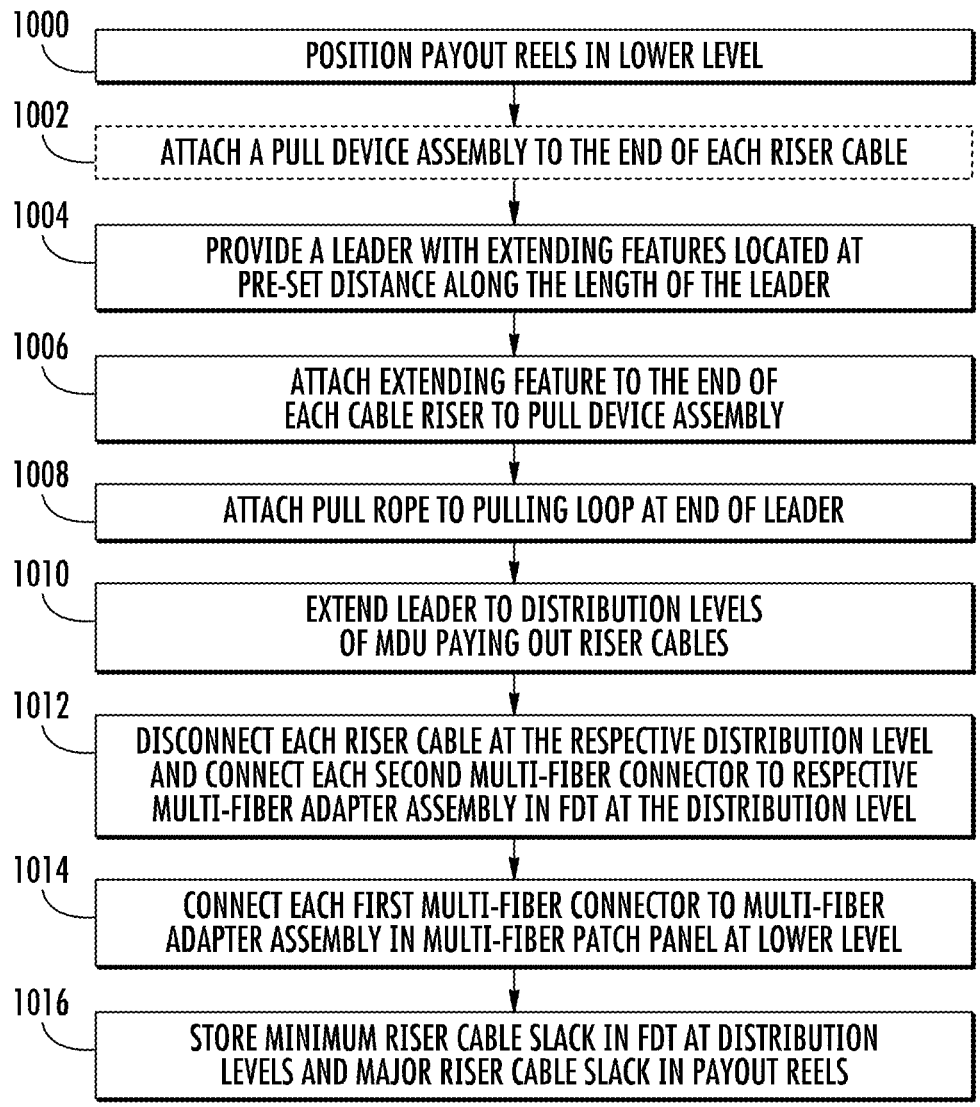
FIG. 8 is a flowchart illustrating a method of installing a plurality of preconnectorized riser cables from payout reels located at a lower level to FDTs located at distribution levels, according to an exemplary embodiment.

FIG. 8 is a flowchart illustrating a method of installing a plurality of preconnectorized riser cables 14(1), 14(2), 14(3), from payout reels 18(1), 18(2), 18(3) located at a lower level 22 to FDTs 29 located at upper levels 24, 26, 28 according to an exemplary embodiment. The payout reels 14(1), 14(2), 14(3) are positioned in the lower level 22 (Step 1000). Optionally, a pull device assembly 62 may be attached to the end of each riser cable 14(1), 14(2), 14(3) (Step 1002). A leader 58 with extending features 60 located at the pre-set distance "Y" along the length of the leader 58 is provided (Step 1004). As a non-limiting example, the leader may be a 180 pound rated urethane jacketed kevlar. The extending features 60 are attached to the end of each riser cable 14(1), 14(2), 14(3), particularly to each pull device assembly 62 if such is provided (Step 1006). A pull rope or string is attached to the end of the leader 58 through a pull loop 68 (Step 1008) and, using the pull rope or string, the leader 58 is pulled to the distribution levels 24, 26, 28 of the MDU 10 in an ascending order paying out the riser cables 14(1), 14(2), 14(3) from the respective payout reels 18(1), 18(2), 18(3) (Step 1010). As a non-limiting example, the pull rope or string may be a 200 pound rated nylon pull string. A 50 pound pull tension rated plastic mesh pulling grip may also be used. At each successive distribution level 24, 26, 28 in the ascending order, the leader 58 is accessed and the appropriate riser cable 14(1), 14(2), 14(3) for that distribution level 24, 26, 28 is extended. The appropriate riser cable 14(1), 14(2), 14(3) is disconnected from the extending feature 60 and the second multi-fiber connector 32(1), 32(2), 32(3) to the respective multi-fiber adapter assembly 34 in the FDT 29 at the distribution level 24, 26, 28 (Step 1012). The first multi-fiber connectors 30(1), 30(2), 30(3) may be connected to the multi-fiber adapter assembly 34 located in the patch panel enclosure 20 (Step 1014). Riser cable 14 slack may be stored in the FDT 29 at the distribution level 24, 26, 28 and/or in the payout reels 18(1), 18(2), 18(3) (Step 1016). The payout reels 18(1), 18(2), 18(3) may be removably mounted in the patch panel enclosure 20.

Referring again also to FIG. 4, as a non-limiting example, the extending features 60 may be positioned further apart than the spacing between distribution levels 24, 26, 28. If the distribution level is aligned with a floor of the MDU 10, and the floors are spaced at 12 feet, the extending feature 60 may be spaced at 14 feet. The leader 58 and the riser cable 14(3) is then extended to the upper-most distribution level 28. An adequate amount of slack of the riser cable 14(3), for example, 10 feet of slack, is pulled up and stored in the FDT 29 at the distribution level 28. The riser cable 14(3) slack is manually accessed and extended to the FDT 29 and the second multi-fiber connector 32(3) connected to the multi-fiber adapter assembly 34 in the FDT 29. This allows for enough slack of the riser cable 14(3) to better facilitate installation. A similar process may then be used with successively descending distribution levels 26, 24 of the MDU 10 until the installation is complete.

Figure 9:
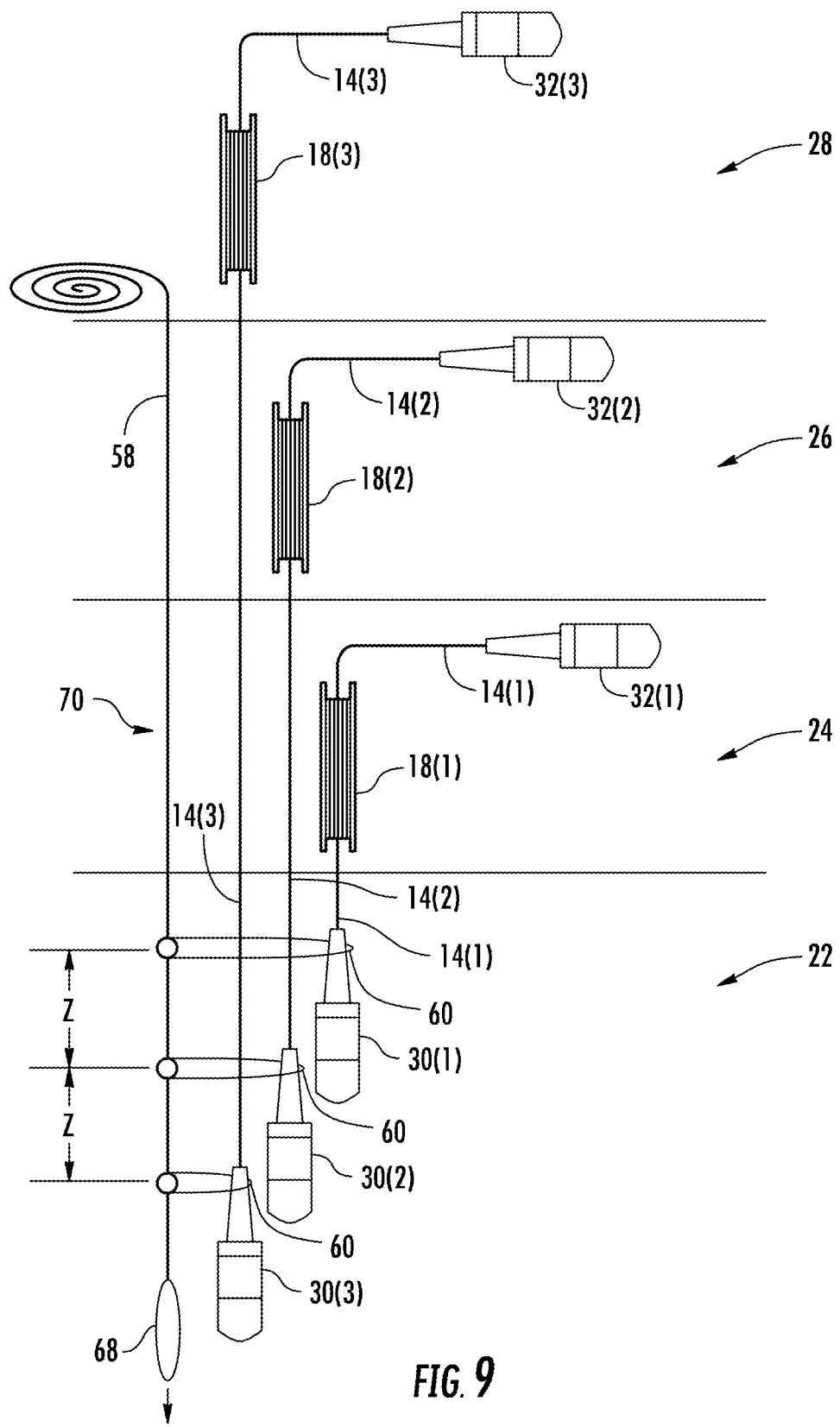
FIG. 9 is a schematic diagram of an elevation view of an exemplary preconnectorized riser cable installation assembly with a plurality of preconnectorized risers being extended from payout reels located at distribution levels by a leader with extending features attached to the leader at preset locations.

FIG. 9 is a schematic diagram of an elevation view of an exemplary preconnectorized riser cable installation assembly 70 with a plurality of preconnectorized riser cables 14(1), 14(2), 14(3) being extended from payout reels 18(1), 18(2), 18(3) each located at respective distribution levels 24, 26, 28 of the MDU 10. The riser cables 14(1), 14(2), 14(3) by a leader 58 with extending features 60 attached to the leader 58 at preset locations at a distance "Z" along the length of the leader 58. The extending feature 60 may be any type of loop, hook, swivel, or the like, configured to attach to the second multi-fiber connectors 32(1), 32(2), 32(3), or to some type of pull device attached to the second multi-fiber connectors 32(1), 32(2), 32(3) to provide for safely and effectively paying out the riser cables 14(1), 14(2), 14(3). The pull device assembly 66 described with respect to FIG. 7A, above, may be attached to the end of the riser cables 14(1), 14(2), 14(3) to facilitate extending the riser cables 14(1), 14(2), 14(3) from the payout reels 18(1), 18(2), 18(3).

The distance "Z" is preset to a value, as a nonlimiting example, 6 inches, to allow the leader 58 to be accessed at each succeeding distribution level 24, 26, 28 in descending order to attach extending feature 60 to the particular riser cable 14(1), 14(3). In other words, the riser cable 14(3) for the highest distribution level 28 is attached to the leader first. Then the riser cable 14(2) for then next lower distribution level 26 is attached to the leader 58. Then the riser cable 14(1) for the next lower distribution level 24 is attached to the leader 58. The leader 58 extends to the lower level 22. Any riser cable 14 slack may be stored on the respective payout reel 18(1), 18(2), 18(3) and/or loosely in the FDT 29 and/or a slack enclosure (not shown in FIG. 9) at the distribution level 24, 26, 28. Additionally, slack may be stored in the patch panel enclosure 20. Each second multi-fiber connectors 32(1), 32(2), 32(3), may then be connected to the respective multi-fiber adapter assembly 34 removably mounted in the FDT 29 located at the respective distribution level 24, 26, 28. Additionally, the first multi-fiber connectors 30(1), 30(2), 30(3) attached to respective riser cables 14(1), 14(2), 14(3) may be connected to the respective multi-fiber adapter assembly 34 removably mounted in the patch panel enclosure 20.

Figure 10:
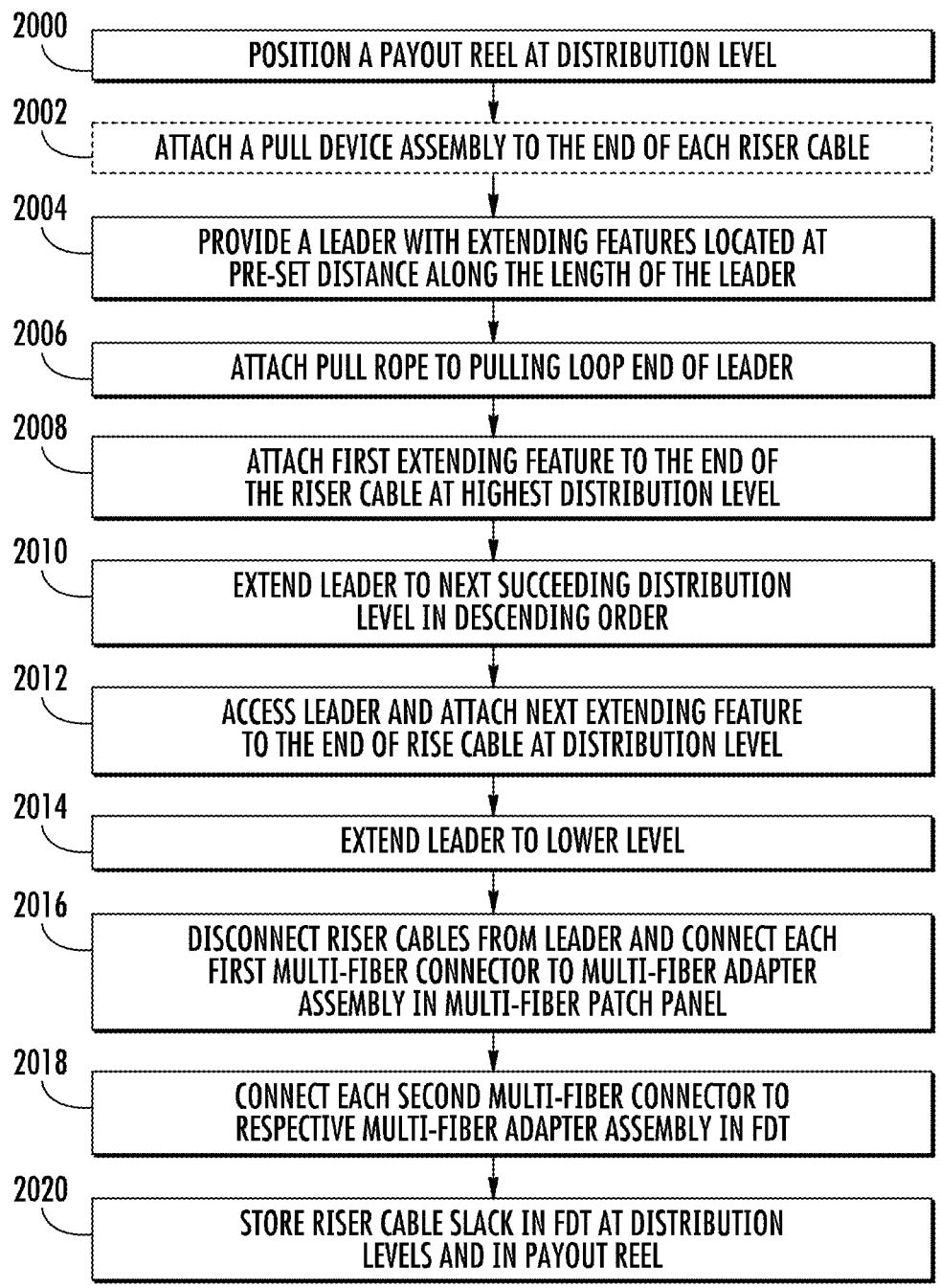
FIG. 10 is a flowchart illustrating a method of installing a plurality of preconnectorized riser cables from payout reels located at distribution levels to a patch panel enclosure located at the lower level, according to an exemplary embodiment.

FIG. 10 is a flowchart illustrating a method of installing a plurality of preconnectorized riser cables 14(1), 14(2), 14(3) from payout reels 18(1), 18(2), 18(3) located at distribution levels 24, 26, 28 of MDU 10 to the patch panel enclosure 20, according to an exemplary embodiment. The payout reels 14(1), 14(2), 14(3) are each positioned at respective distribution levels 24, 26, 28 (Step 2000). Optionally, a pull device assembly 62 may be attached to the end of each riser cable 14(1), 14(2), 14(3) (Step 2002). A leader 58 with extending features 60 located at the pre-set distance "Z" along the length of the leader 58 is provided (Step 2004). As a non-limiting example, the leader may be a 180 pound rated urethan jacketed kevlar. A pull rope or string is attached to the pulling loop 68 at the end of the leader 58 (Step 2006). As a non-limiting example, the pull rope or string may be a 200 pound rated pull string. A 50 pound pull tension rated plastic mesh pulling grip may also be used. One of the extending features 60, which may be the first extending feature 60 closest to the pulling loop 68 is attached to the riser cable 14(3) from the payout reel 18(3) located at the highest distribution level 28 in the MDU 10 (Step 2008). The leader 58 is extended to the next succeeding distribution level 26, 24 in descending order (Step 2010). At the next succeeding distribution level 26, 24, the leader 58 is accessed and the next extending feature 60 is attached to the end of that riser cable 14(2), 14(3) (Step 2012). The leader 58 is extended to all of the distribution levels and the riser cable attached in the same manner. The leader 58 is extended to the lower level 22 (Step 2014). The riser cables 14(1), 14(2), 14(3) are disconnected from the leader 58 and each first multi-fiber connector 30(1), 30(2), 30(3) is connected to the multi-fiber adapter assembly 34 in the patch panel 20 enclosure (Step 2016). Each second multi-fiber connector 32(1), 32(2), 32(3) is connected to respective multi-fiber adapter assemblies 34 in the FDT 29 located at the distribution levels 24, 26, 28 (Step 2018). Riser cable 14 slack may be stored in the FDT 29 at the distribution level 24, 26, 28 and/or in the payout reels 18(1), 18(2), 18(3) (Step 2020). The payout reels 18(1), 18(2), 18(3) may be removably mounted in the FDT 29. Slack may also be stored in the patch panel enclosure 20.

Figure 11:
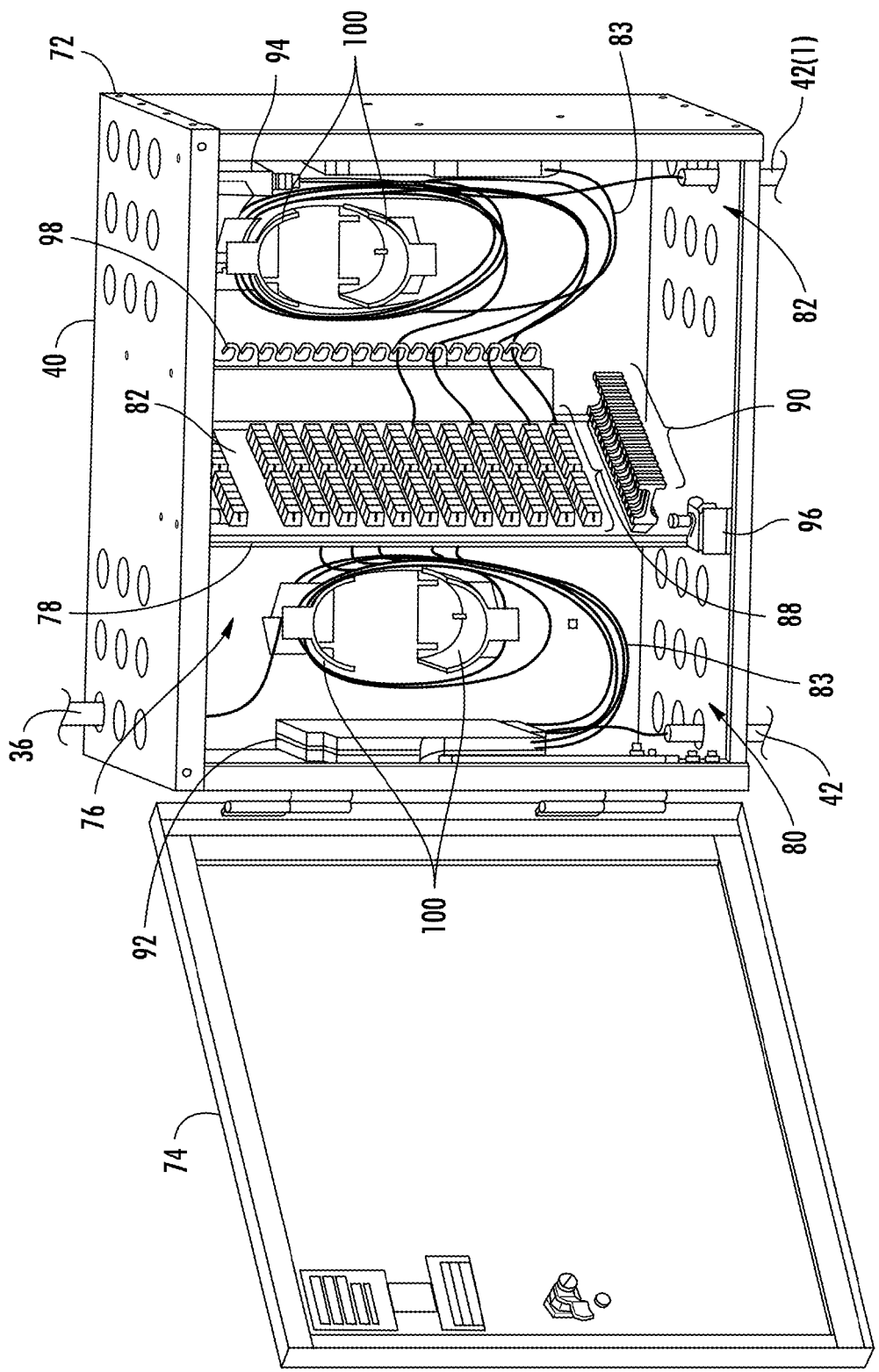
FIG. 11 is a schematic diagram of a front, perspective view of an exemplary local convergence point (LCP) for use with a fiber optic network in a MDU.

FIG. 11 is a schematic diagram of a front, perspective view of an exemplary LCP 40 for use with a fiber optic network in a MDU 10. The LCP 40 comprises an enclosure 72 with a door 74 hingedly attached to the enclosure 72. The door 74 closes to restrict and/or prohibit access to the interior 76 of the enclosure 72 and the components mounted therein, and opens to allow access to the interior 76 and the components mounted therein. A swingable adapter panel 78 mounts in the interior 76. The adapter panel 78 has a first side 80 (not visible in FIG. 11) and a second side 82 to provide connections of optical fibers 83 between a feeder side and a distribution side. Pivot points 96 positioned at the top and bottom of the interior 76 allow the adapter panel to swing to provide access to the first side 80 or the second side 82 depending on the positioning of the adapter panel 78. Additionally, the adapter panel is lockable in one or more positions. The adapter panel 78 splits the interior 76 into a first section 84 and a second section 86. The LCP 40 is flexible such that either or both the first section 84 or the second section 86 can be configured to support feeder side optical fiber 83 management and/or connections, and/or distribution side optical fiber 83 management and/or connections.

The adapter panel 78 has a connection field 88 that supports multi-fiber adapters and connections, single fiber adapters and connections as well as pass-through adapters and connection. In FIG. 11, the feeder cable 42 is shown as entering the LCP 40 at the bottom into the first section 84 and connecting to splice trays 92. A continuing section 42(1) of the feeder cable 42 extends from the bottom of the second side 86 to further provide optical connection from the service provider to other areas of the MDU 10 and/or to other MDU's and/or facilities. The distribution cable 36 extends from the top of the first section 84. The distribution cable 36 optically connects to one or more riser cables 14, which may be through a multi-fiber adapter assembly 34 in a patch panel housing 20. One or more splitters 94 may also be mounted in the LCP 40 to split the optical signal carried by the feeder cable 42 into multiple optical signals for distribution. Fiber routing guides 98 and fiber management guides 100 may also be mounted in the first section 84 and/or the second section 86.

Figure 11A:
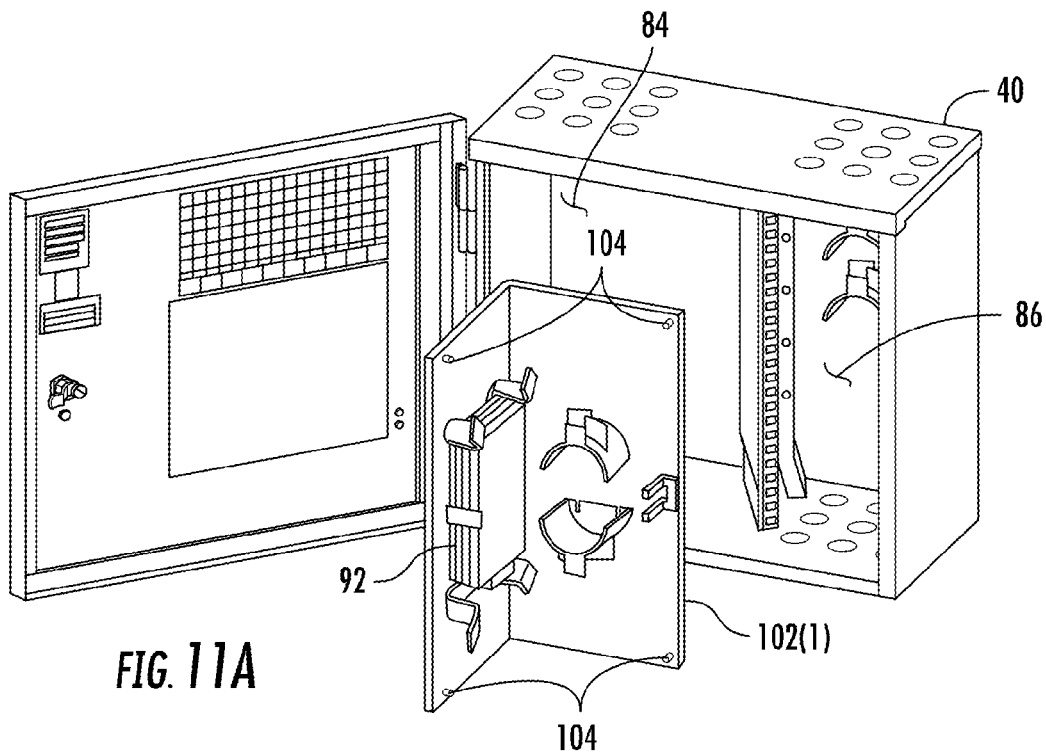
FIG. 11A is a schematic diagram of a front, perspective exploded view of the LCP of FIG. 11 having an interior panel removably mountable in the LCP, wherein the interior panel is configured to support optical fiber in a first section of the LCP.
Figure 11B:
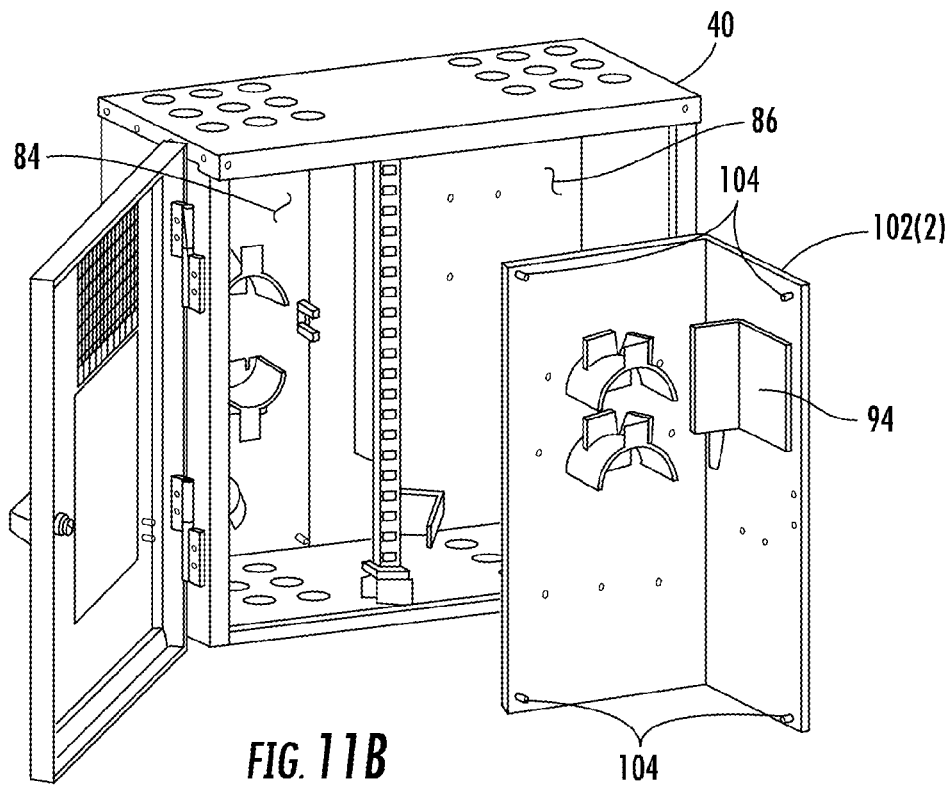
FIG. 11B is a schematic diagram of a front, perspective exploded view of the LCP of FIG. 11 having an interior panel removably mountable in the LCP, wherein the interior panel is configured to support optical fiber splitting in the second section of the LCP.
Figure 11C:
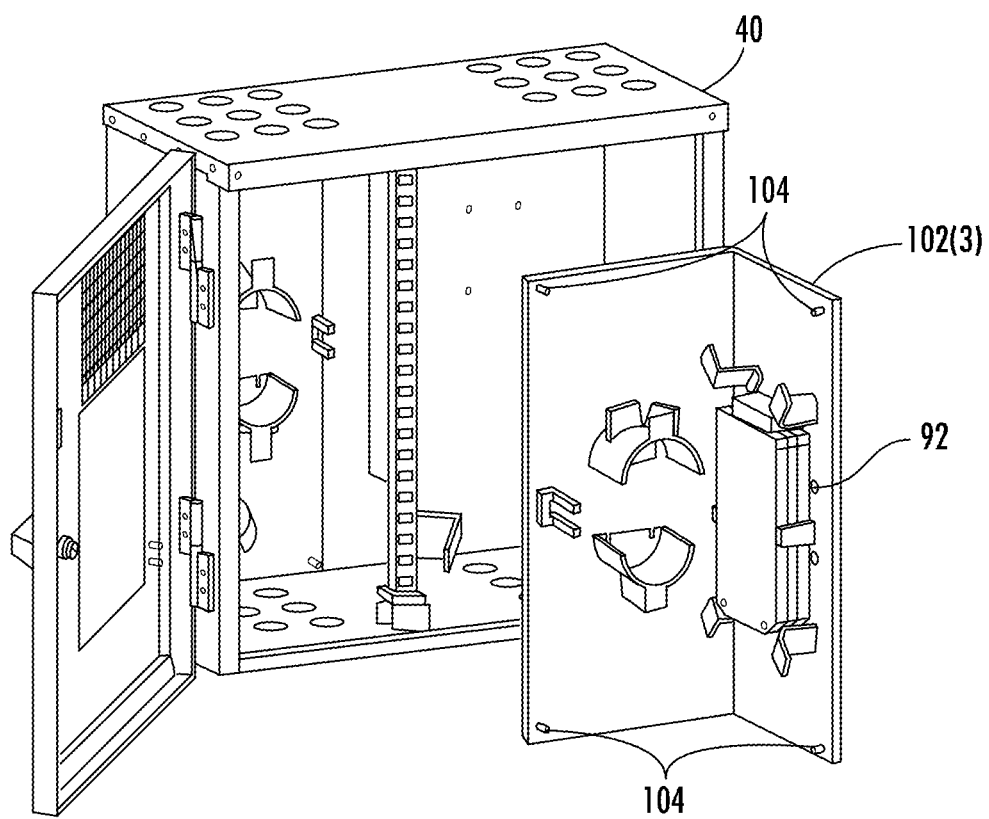
FIG. 11C is a schematic diagram of a front, perspective exploded view of the LCP of FIG. 11 having an interior panel removably mountable in the LCP, wherein the interior panel is configured to support optical fiber splicing in the second section of the LCP.

FIGS. 11A, 11B and 11C are schematic diagrams of front, perspective, exploded views of the LCP 40 illustrating interior panels 102(1), 102(2), 102(3) which may be used in the LCP 40. The interior panels 102(1), 102(2), 102(3) are interchangeable and allow the LCP 40 enclosure 72 to be easily reconfigured at the factory or in the field. This allows the enclosure 72 to be configured and reconfigured to support multiple applications and changing subscriber situations. In this manner, the interior panels 102(1), 102(2), 102(3) can support, without limitation, fiber splicing, multiple splitter form factors, cable entries and other various modifications or arrangements of the LCP 40. Additionally, the interior panels 102(1), 102(2), 102(3) can be installed on the either the first section 84 or second section 86 of the interior 76 using any type of fasteners 104, such as, without limitation, screws, latches and the like allowing for removable attachment.

In this regard, FIG. 11A illustrates an interior panel 102(1) removably mountable to the enclosure 72 in the interior 76 in the first section 84 configured to support optical fiber splicing having splice trays 92 and optical fiber management guides 100. FIG. 11B illustrates an interior panel 102(2) removably mountable to the enclosure 72 in the interior 76 in the second section 86 configured to support optical fiber splitting having splitters 94 and optical fiber management guides 100. FIG. 11C illustrates an interior panel 102(2) removably mountable to the enclosure 72 in the interior 76 in the second section 86 configured to support optical fiber splicing having splice trays 92 and optical fiber management guides 100. Similarly, although not shown, an interior panel 102 removably mountable to the enclosure 72 in the interior 76 in the first section 84 may be configured to support optical fiber splitting having splitters 94 and optical fiber management guides 100. Additionally or alternatively, the interior panels 102 may be configured to support any type of function or component, as examples, without limitation, furcation devices, ribbon fan-out bodies, wave division multiplexing, coarse wave division multiplexing and others.

The LCP 40 provides for a smaller form factor while allow a high density of optical fiber connections for distribution of optical service to the MDU 10. Additionally, the LCP 40 allows for various options for feeder and distribution cables and of multiple splitters including, without limitation, at least five 1×32 splitters. The LCP 40 can also function as a demarcation point providing 1×1 input to output connections.

Figure 12:
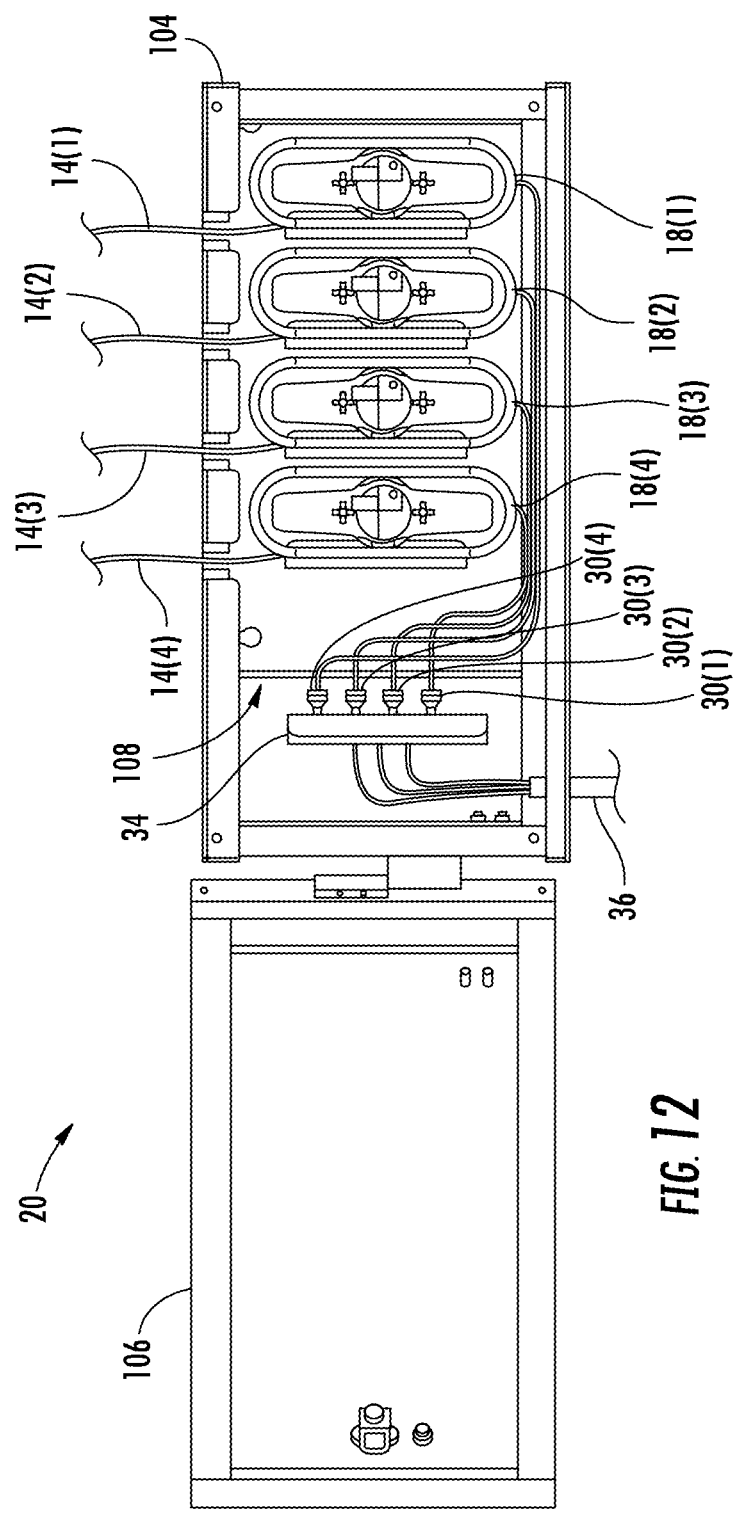
FIG. 12 is a schematic diagram of front, elevation views of an exemplary patch panel enclosure with a multi-fiber adapter assembly and multiple payout reels removably mounted therein.

FIG. 12 is a schematic diagram of front, elevation views of an exemplary patch panel enclosure 20 with a multi-fiber adapter assembly 34 and multiple payout reels 18 removably mounted therein. The patch panel enclosure 20 has a door 104 hingedly attached thereto. The door 104 closes to restrict and/or prohibit access to the interior 106 of the patch panel enclosure 20 and the components mounted therein, and opens to allow access to the interior 106 and the components mounted therein. In FIG. 12, a multi-fiber adapter assembly 34 and multiple payout reels 18(1), 18(2), 18(3), 18(4), are shown mounted in the interior 106. The riser cables 14(1), 14(2), 14(2), 14(2) are shown as having been paid out from the payout reels 18(1), 18(2), 18(3), 18(4) which are now being used to store riser cable 14(1), 14(2), 14(2), 14(2) slack. The payout reels 18(1), 18(2), 18(3), 18(4) are shown as being collapsed to a smaller form factor allowing for storing in the patch panel enclosure 20. The first multi-fiber connectors 30(1), 30(2), 30(3), 30(4) route and connect to one side of the multi-fiber adapter assembly 34. The distribution cable 36 connects to the other end of the multi-fiber adapter assembly 34 and extends from the bottom of the patch panel enclosure 20. Mounting holes 108 allow the patch panel enclosure 20 to be mounted as non-limiting examples, to a wall or rack.

Figure 13:
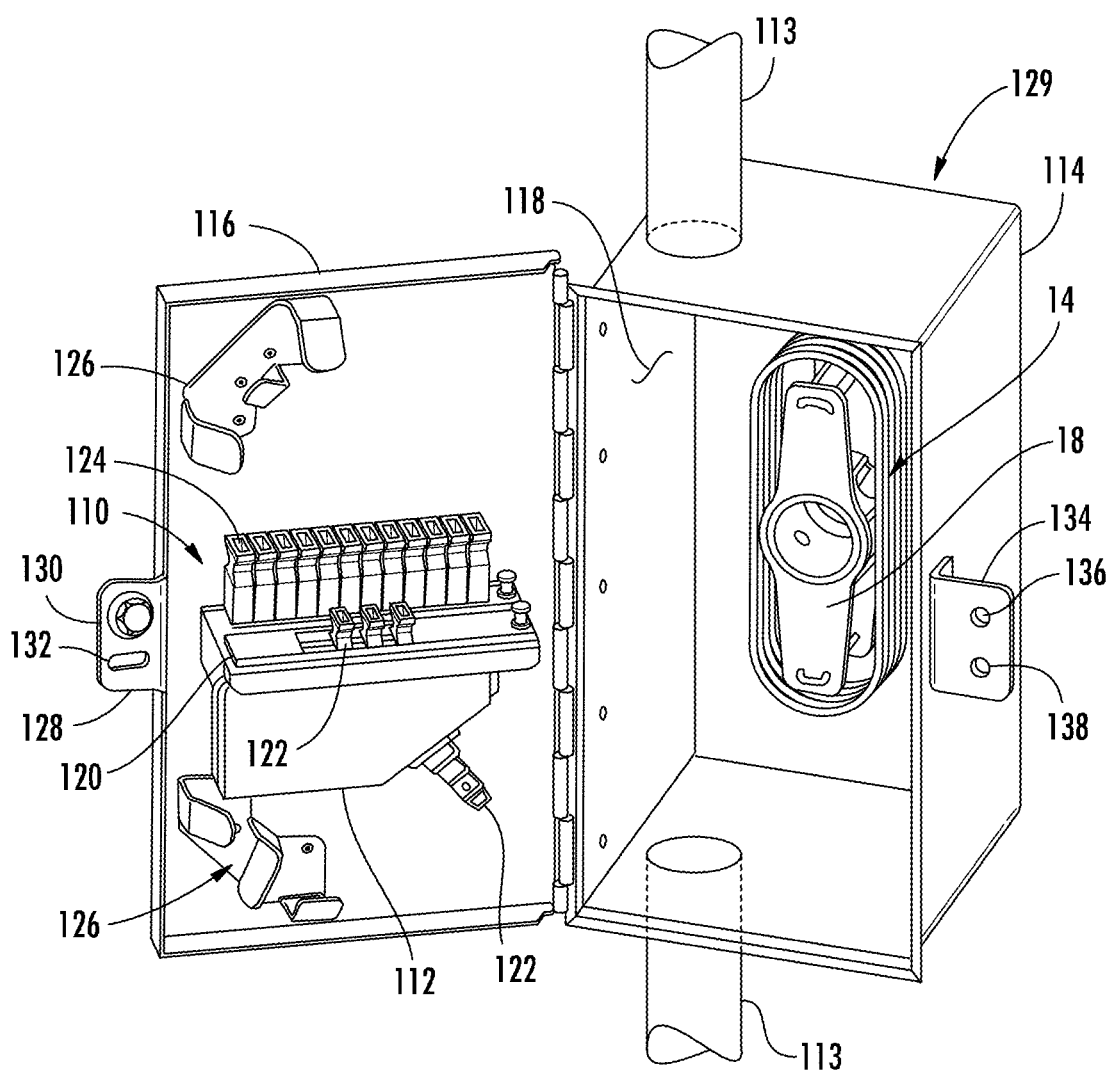
FIG. 13 is a schematic diagram of a front, perspective view of an exemplary FDT having a module with multi-fiber adapters and single fiber adapters and a payout reel removably mounted therein, wherein the FDT is configured to be mounted in-line with and supported by the conduit carrying the riser cable.

FIG. 13 is a schematic diagram of a front, perspective view of a FDT 129 having a payout reel 18 and an adapter module assembly 110 with an adapter module 112 and a multi-fiber adapter assembly 34 removably mounted therein. In the embodiment depicted in FIG. 13, the FDT 129 is configured to be mounted in-line with and supported by conduit 113 carrying the riser cable 14 and may be mounted at one or more distribution levels 24, 26, 28. The FDT 129 has an enclosure 114 with a door 116 hingedly attached thereto. The door 116 closes to restrict and/or prohibit access to the interior 118 of the FDT 129 and the components mounted therein, and opens to allow access to the interior 118 and the components mounted therein. In FIG. 13, the adapter module assembly 110 is shown mounted to the door 116 in the interior 118. The adapter module assembly 110 comprises a connector panel 120 to which the adapter module 112 and the multi-fiber adapter assembly 34 attach. The multi-fiber adapter assembly 34 has multi-fiber adapters 122. Additionally, the adapter module 112 has multiple single fiber adapters 124. In this manner, the adapter module assembly 110 can receive and connect the riser cable 14 to drop cables 44 extending to subscriber premises 48 located on the distribution levels 24, 26, 28.

Routing guides 126 route and manage fiber optic cables may be mounted to the door 116 in the interior 118 in addition to the adapter module assembly 110. The door 116 has a flange 128 having a tool lock mechanism 130 and a pad lock hole 132. A flange 134 on the enclosure 114 has a tool lock receiver 136 and pad lock hole 138, which mate with the tool lock mechanism 130 and a pad lock hole 132 when the door 116 is closed to provide for locking the FDT 129. The riser cable 14 is shown as having been paid out from the payout reel 18 which is now being used to store riser cable 14 slack. The payout reel 18 is shown as being collapsed to a smaller form factor allowing for storing in the FDT 129.

Figure 14:
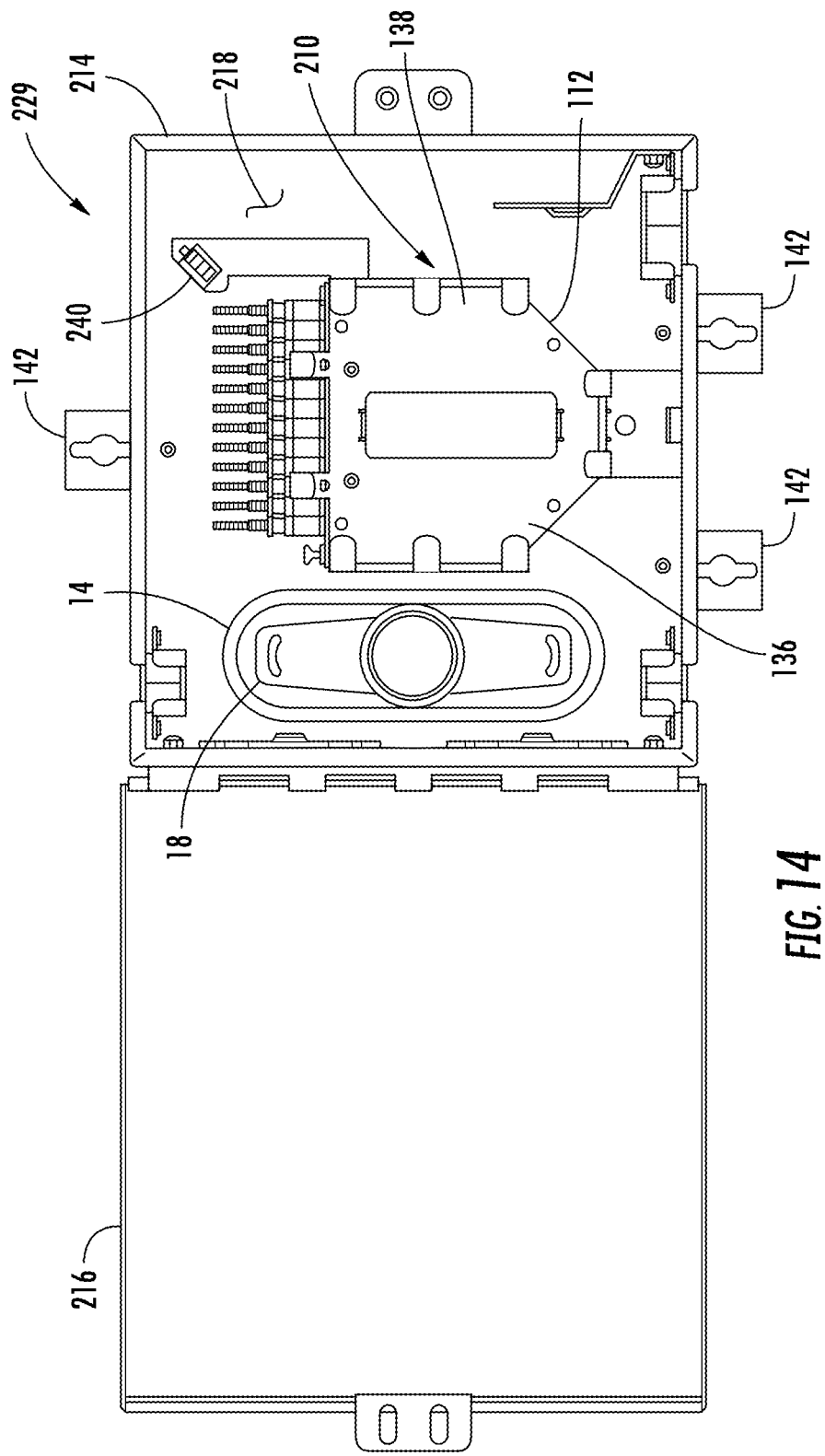
FIG. 14 is a schematic diagram of a front, perspective view of an exemplary FDT having a module assembly with multi-fiber adapters and single fiber adapters pivotably mounted therein and a payout reel removably mounted therein, wherein the FDT is configured to be wall or closet mounted.

FIG. 14 is a schematic diagram of a front, perspective view of an exemplary FDT 229 having a payout reel 18 removably mounted therein and an adapter module assembly 210 pivotably mounted therein. The FDT 229 has an enclosure 214 with a door 216 hingedly attached thereto, and may be located at one or more distribution levels 24, 26, 28. The door 216 closes to restrict and/or prohibit access to the interior 218 of the FDT 229 and the components mounted therein, and opens to allow access to the interior 218 and the components mounted therein. The adapter module assembly 210 has a cradle 136 adapted to removably hold one or more adapter modules 112 or adapter panels. The cradle 136 has a slack storage area 138 for storing the slack of drop cables 44 extending to subscriber premises 48 located at the distribution level 24, 26, 28. A routing guide 240 connecting to and extending from the cradle provides for drop cable 44 routing and management in the FDT 229. One or more mounting ears 142 extend from the enclosure 214 allowing the enclosure 214 to be mounted to a wall, for example in a closet, at the distribution level 24, 26, 28. The door 216 has a flange 228 having a tool lock mechanism 130 and a pad lock hole 132. A flange 234 on the enclosure 214 has a tool lock receiver 136 and pad lock hole 138, which mate with the tool lock mechanism 130 and a pad lock hole 132 when the door 116 is closed to provide for locking the FDT 229. The riser cable 14 is shown as having been paid out from the payout reel 18 which is now being used to store riser cable 14 slack. The payout reel 18 is shown as being collapsed to a smaller form factor allowing for storing in the FDT 229.

Figure 15:
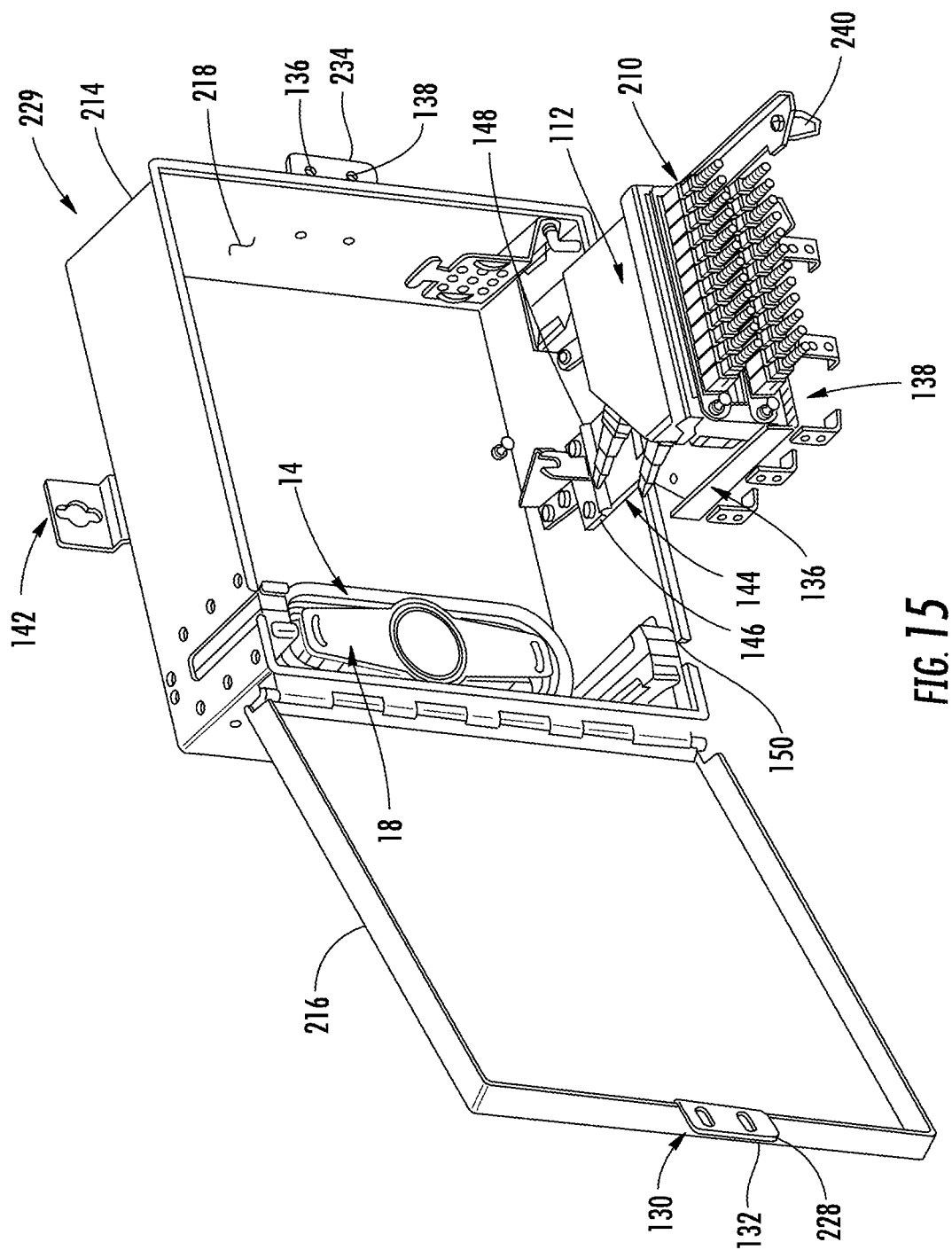
FIG. 15 is a schematic diagram of the front, elevation perspective view of the FDT of FIG. 14 with the module assembly pivoted to an open position.

FIG. 15 is a schematic diagram of the front, elevation perspective view of the FDT 229 with the adapter module assembly 210 pivoted to an open position. The adapter module assembly 210 has a pivot assembly 144 connected to the bottom of the enclosure 214. In FIG. 15, the pivot assembly 144 is illustrated as a cradle bracket 146 and a cradle hinge 148. However, the pivot assembly 144 can be any mechanical or structural design that allows the adapter module assembly 210 to pivot. Sealing feature 150 allows the riser cable 14 and drop cables 44 to enter the enclosure 214 while maintaining the FDT 229 in an environmentally sealed condition. One or more strain relief brackets 152 provide strain relief for the riser cable 14 and drop cables 44 in the FDT 229.

Many modifications and other embodiments set forth herein will come to mind to one skilled in the art to which the embodiments pertain having the benefit of the teachings presented in the foregoing descriptions and the associated drawings. Therefore, it is to be understood that the description and claims are not to be limited to the specific embodiments disclosed and that modifications and other embodiments are intended to be included within the scope of the appended claims. It is intended that the embodiments cover the modifications and variations of the embodiments provided they come within the scope of the appended claims and their equivalents. Although specific terms are employed herein, they are used in a generic and descriptive sense only and not for purposes of limitation.

What is claimed is:

1. A fiber optic network for a multiple dwelling unit (MDU) having a plurality of distribution levels, comprising:
a riser cable preconnectorized with a first riser optical connector, wherein the riser cable is optically connected to a feeder cable providing optical communication service to the MDU, and wherein the riser cable has a plurality of preset distribution level access points along the length of the riser cable, and wherein one or more optical fibers of the riser cable extend from the riser cable at each of the plurality of preset distribution level access points and are preconnectorized with at least one second riser optical connector;

a first adapter located at a lower level of the MDU, the first adapter having a first end and a second end, wherein the first adapter is configured to receive the first riser optical connector at the first end of the first adapter;

a plurality of second adapters, each located at one of the plurality of distribution levels, each second adapter having a first end and a second end; and a payout reel adapted to pay out the riser cable such that the riser cable extends between the lower level and at least one of the plurality of distribution levels, and wherein each second adapter is configured to receive one of the at least one second riser optical connector at the first end of the second adapter and to optically connect a drop cable via the second end of the second adapter to establish optical connection between the feeder cable, the riser cable and the drop cable, and wherein the payout reel is adapted to store a length of the riser cable when the first riser optical connector is received by the first adapter and each second riser optical connector is received by one of the plurality of second adapters.

2. The fiber optic network of claim 1, wherein the payout reel is located at the lower level.

3. The fiber optic network of claim 1, wherein the payout reel is located at one of the plurality of distribution levels.

4. The fiber optic network of claim 1, further comprising a slack housing, wherein the payout reel is located in the slack housing.

5. The fiber optic network of claim 4, wherein the first adapter is located in the slack housing.

6. The fiber optic network of claim 4, wherein at least one of the plurality of second adapters is located in the slack housing.

7. The fiber optic network of claim 1, wherein the first adapter is a multi-fiber adapter.

8. The fiber optic network of claim 1, wherein each of the plurality of second adapters is a multi-fiber adapter.

9. The fiber optic network of claim 1, wherein each of the plurality of second adapters is removably mounted in a fiber distribution terminal (FDT) located at one of the plurality of distribution levels.

10. The fiber optic network of claim 1, wherein each of the plurality of second adapters is removably mounted in a module.

11. The fiber optic network of claim 10, wherein the module is removably mounted in a fiber distribution terminal located at one of the plurality of distribution levels.

12. The fiber optic network of claim 10, wherein each of the plurality of second adapters is a multi-fiber adapter is mounted inside the module.

13. The fiber optic network of claim 10, wherein each of the plurality of second adapters is a multi-fiber adapter is mounted through a wall of the module.

14. The fiber optic network of claim 1, wherein the drop cable extends to a subscriber premises at one of the plurality of distribution levels to provide optical communication service to the subscriber.

* * * * *